United States Patent
Vattem et al.

(10) Patent No.: US 12,449,396 B2
(45) Date of Patent: Oct. 21, 2025

(54) ELECTROTRANSFER AND ELECTROPHORESIS DEVICES, SYSTEMS, AND METHODS

(71) Applicant: PIERCE BIOTECHNOLOGY, INC., Rockford, IL (US)

(72) Inventors: Krishna Vattem, Rockford, IL (US); Brian Webb, Rockford, IL (US)

(73) Assignee: Life Technologies Corporation, Carlsbad, CA (US)

( * ) Notice: Subject to any disclaimer, the term of this patent is extended or adjusted under 35 U.S.C. 154(b) by 399 days.

(21) Appl. No.: 18/012,236

(22) PCT Filed: Jul. 7, 2021

(86) PCT No.: PCT/IB2021/056779
§ 371 (c)(1),
(2) Date: Dec. 22, 2022

(87) PCT Pub. No.: WO2022/023959
PCT Pub. Date: Feb. 3, 2022

(65) Prior Publication Data
US 2023/0366852 A1    Nov. 16, 2023

Related U.S. Application Data
(60) Provisional application No. 63/057,784, filed on Jul. 28, 2020.

(51) Int. Cl.
G01N 27/447    (2006.01)
G01N 27/453    (2006.01)

(52) U.S. Cl.
CPC . *G01N 27/44756* (2013.01); *G01N 27/44717* (2013.01)

(58) Field of Classification Search
CPC ....... G01N 27/44739; G01N 27/44756; G01N 27/44717
See application file for complete search history.

(56) References Cited

U.S. PATENT DOCUMENTS

| | | | | |
|---|---|---|---|---|
| 5,164,475 A | * | 11/1992 | Wheland | G01N 27/44717 521/184 |
| 5,234,559 A | * | 8/1993 | Collier | G01N 27/44717 204/464 |

(Continued)

FOREIGN PATENT DOCUMENTS

| CN | 1549924 A | 11/2004 |
|---|---|---|
| CN | 103163194 A | 6/2013 |

(Continued)

OTHER PUBLICATIONS

Article—Comprehensive List of Transparent Polymers SpecialChem—Oct. 25, 2017, on the Omnexus website, https://omnexus.specialchem.com/tech-library/article/comprehensive-list-of-transparent-polymers.*

(Continued)

*Primary Examiner* — Alexander S Noguerola
(74) *Attorney, Agent, or Firm* — Priya D. Subramony

(57) ABSTRACT

The present disclosure provides devices and systems for gel electrophoresis and/or electrotransfer and/or detection of biomolecules. Devices for electrotransfer comprise: one or more receptacles comprising: a biomolecule receiving material (BMR); a first and second electrode; wherein the second electrode is located after and/or distal to an area where biomolecules are received OR wherein both electrodes are arranged to allow current flow in at least two directions, wherein the second direction of current flow is along the plane of the BMR. Devices and systems can be adapted to perform electrophoresis, wherein the receptacle further comprises a matrix for electrophoretic separation of biomol- (Continued)

ecules. Devices and systems can be further adapted to perform detection, wherein the receptacle further comprises reagent dispensing channels or ports and/or reagents to detect electrotransferred biomolecules. Devices and systems of the disclosure can be microfluidic devices. Methods using the systems and devices of the disclosure are also provided.

35 Claims, 33 Drawing Sheets

(56) References Cited

U.S. PATENT DOCUMENTS

| | | | |
|---|---|---|---|
| 6,569,306 | B1 | 5/2003 | Read et al. |
| 9,702,851 | B1 * | 7/2017 | Woodham ........ G01N 27/44778 |
| 2006/0272946 | A1 | 12/2006 | Margalit et al. |
| 2007/0187244 | A1 * | 8/2007 | Zhu .................. G01N 27/44704 204/462 |
| 2017/0131235 | A1 * | 5/2017 | Woodham ........ G01N 27/44721 |
| 2017/0276644 | A1 * | 9/2017 | Tominaga ........ G01N 27/44739 |

FOREIGN PATENT DOCUMENTS

| | | |
|---|---|---|
| WO | 03008977 A2 | 1/2003 |
| WO | WO-2006091525 A2 | 8/2006 |
| WO | WO-2007106832 A2 | 9/2007 |

OTHER PUBLICATIONS

PCT/IB2021/056779, International Search Report and Written Opinion, Nov. 2, 2021, 13 pages.
Communication pursuant to Article 94(3) EPC received for EP Application No. 21766512.4 dated Apr. 23, 2025, 5 pages.
First Office Action received for CN Application No. 202180038125.1, dated Mar. 3, 2025, 30 pages (including English Translation).

* cited by examiner

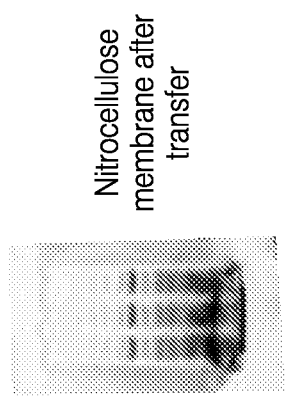
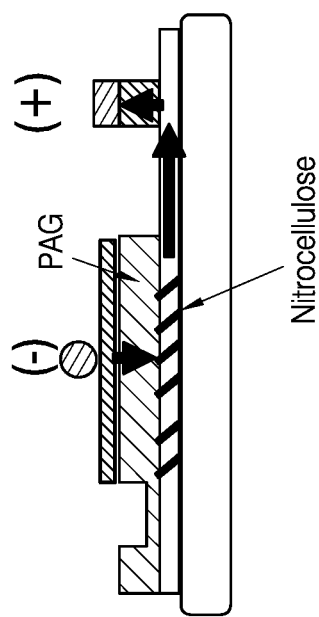
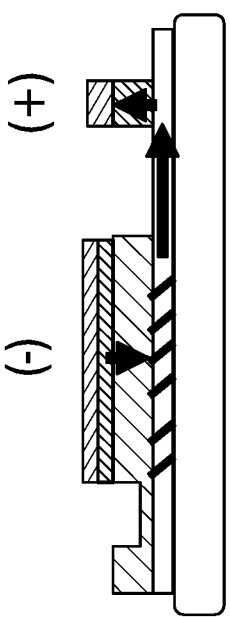
FIG. 4A
FIG. 4B
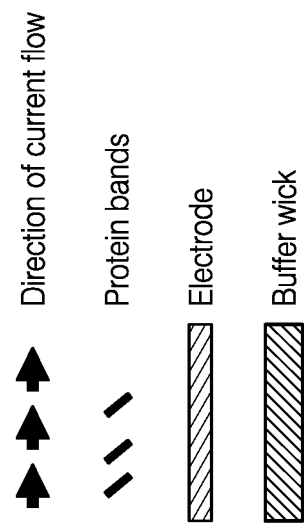

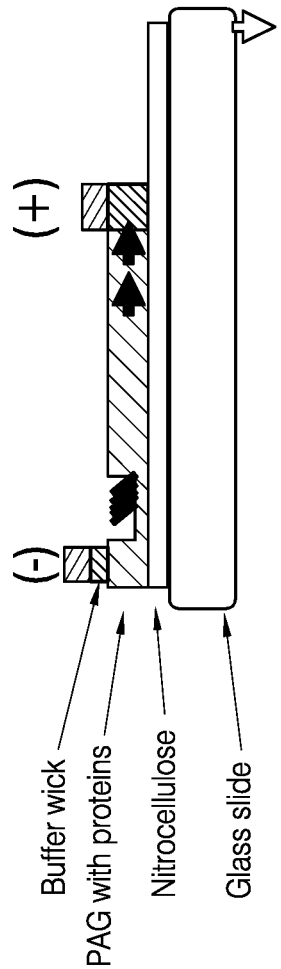
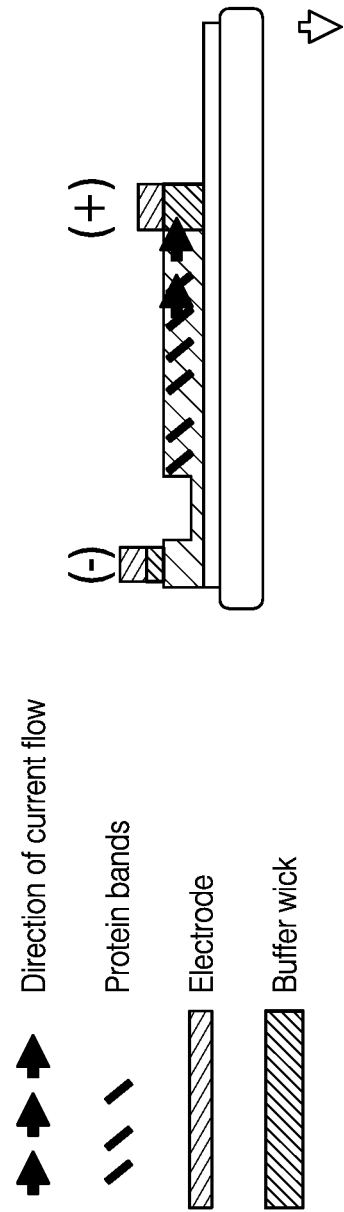
FIG. 5A
FIG. 5B

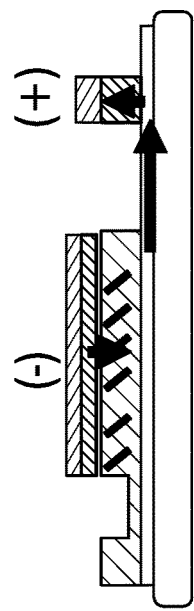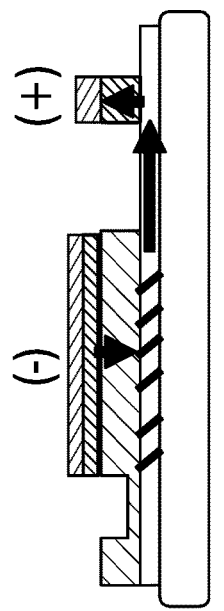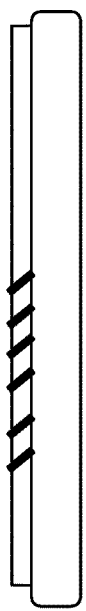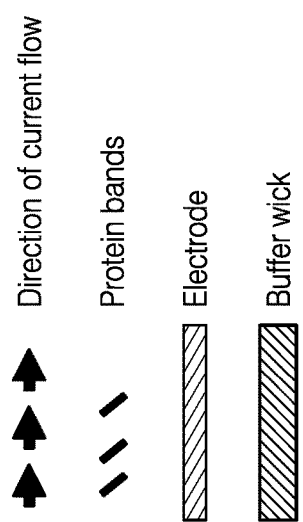

ELECTROTRANSFER AND ELECTROPHORESIS DEVICES, SYSTEMS, AND METHODS

CROSS-REFERENCE TO RELATED APPLICATIONS

This application claims the benefit of U.S. Provisional Application No. 63/057,784 filed Jul. 28, 2020, which is incorporated herein by reference in its entirety.

FIELD

The present disclosure generally relates to systems and devices that can perform electrotransfer of biomolecules. The disclosure relates to systems and devices that can perform both electrophoresis and electrotransfer of biomolecules. The disclosure further relates to electrophoresis and electrotransfer devices and systems that can perform detection of biomolecules. Methods of electrophoresis, electrotransfer, and/or detection using the systems and devices of the disclosure are also described.

BACKGROUND

Electrophoresis is a common procedure for the separation of biological molecules (biomolecules), such as nucleic acids, DNA, RNA, polypeptides and proteins based on their size and charge. In gel electrophoresis, biomolecules can be separated into bands by an electric field that causes the molecules to migrate through a filtering matrix. Typical filtering matrices comprise gels. Traditional electrophoresis cassettes comprise a slab of a filtering matrix (such as a gel), that is sandwiched between two glass or plastic plates. Gels have an open molecular network structure defining pores that are saturated with an electrically conductive buffered solution including a salt. These pores are large enough to enable passage of biomolecules migrating through the gel in response to an electrical field. Several types of gels can be used for electrophoresis such as, but not limited to, polyacrylamide gels, agarose gels and starch gels.

During traditional electrophoresis, a gel, in a pre-cast or a self-cast electrophoresis cassette, is typically loaded with samples containing biomolecules and a tracking dye and placed in a chamber having a cathode and an anode in contact with buffer solutions that enable formation of an electric field across the gel when connected to an electrical power supply. The electric field so generated, is applied across the gel and consists of a negative charge at one end and a positive charge at the other end, causing sample biomolecules and tracking dye to separate from each other and migrate toward the bottom of the gel. The electrophoresis is halted before the biomolecule of interest reaches the end of the gel.

Electrophoretically separated biomolecules are then transferred from the separating gel onto another material in order to perform additional analysis on the biomolecules such as, but not limited to, immunological characterization, chemical reactions, quantitation, etc. Electro-blotting or electrotransfer is a method known in the art for transferring resolved or separated biomolecules from a gel onto another material.

In an electrotransfer method, following electrophoretic separation of biomolecules, the electrophoresis gel containing the separated biomolecules is placed in contact with a relatively thin material or support. The material is typically a porous material, such as, but not limited to, a nitrocellulose-based membrane, a PVDF-based membrane, an activated paper, an activated nylon membrane or the like. A buffer is added to the electrotransfer device and an electrical current is passed through the sandwiched gel and blotting membrane in a direction generally perpendicular to the surface of the blotting membrane. This results in some or most of the biomolecules being electrophoretically transferred from the gel to the porous material.

Biomolecules electrotransferred to materials and supports as described above are then analyzed further by methods including immuno-detection. Several immuno-detection methods are known in the art where an antibody attached to a label is used to bind to a biomolecule of interest, thereby detecting and identifying the biomolecule. Typically, chemi-luminescent labels and reagents are used for detection.

Most of the existing systems and devices of electrophoresis and electrotransfer require separate systems and devices for each procedure. Each procedure requires separate set-up and experimental times as well as multiple pieces of equipment and accessories. Electrotransfer systems also generate large volumes of hazardous waste since they use transfer buffers that typically contains methanol, acetic acid or other hazardous material.

Some automated solutions for electrophoresis, electrotransfer and immunodetection have been described, such as those disclosed in U.S. Pat. Nos. 7,846,676, 7,935,308, 7,935,489, 9,400,277, 7,935,479, 9,304,133, 9,108,195, 9,523,684, 9,766,206 and US. Patent Publication 20180321189. However, these existing technologies include separation of proteins in a matrix followed by crosslinking the separated proteins to the capillaries or to components in the matrix prior to immuno-detection. A major drawback of these systems and methods is the cross-linking step which is known to mask specific epitopes on protein biomolecules resulting in poor antibody recognition during immuno-detection. Hence, these systems and methods require re-optimization and validation of antibodies used for immuno-detection for each new biomolecule and/or antibody used.

Moreover, data output from capillary-based instruments is a "virtual" blot-like image produced from an electrophorogram trace of the immunoassay signal from inside the capillary. This western blot-like readout has not been fully embraced by traditional western blot users.

Another combined electrophoresis/electrotransfer system is described by Woodham in U.S. Pat. No. 9,702,851 which describes a polyacrylamide gel matrix for electrophoresis placed next to a blotting membrane both of which are sandwiched between two semi-conductive polymer containing plates. In order to accomplish the transfer of proteins separated on the polyacrylamide gel matrix to the blotting membrane an electric current has to be applied perpendicular to the direction of migration of proteins in the polyacrylamide gel. For immuno-detection or further processing of biomolecules transferred to the blotting membrane, the entire system has to be dismantled to access the blotting membrane. In addition, in practice, this system does not work well since to date semi-conductive polymers with the required conductivity are not available.

Amy Herr, in "Microfluidic integration for automated targeted proteomic assays", PNAS (2012) 109:5972-5977, describes direct detection of proteins cross-linked to a polyacrylamide gel matrix. These devices and methods are ineffective due to limitations of antibody diffusion kinetics in polyacrylamide gel matrices and an antigen-polyacrylamide gel matrix cross-linking step, both of which can lead to antigen masking and detection issues.

Therefore, a need exists in the art for better electrotransfer systems and device and for systems that can combine gel electrophoresis and electrotransfer and immuno-detection.

SUMMARY

The systems, devices, and methods described herein address several problems in the art. In some embodiments, systems, devices, and methods described herein address problems in the art by providing a single system that can be used for both gel electrophoresis and electrotransfer. In some embodiments, systems, devices, and methods described herein address the problems in the art by providing electrophoresis and electrotransfer devices and systems that provide easy access to the electroblot for further detection/processing/analysis of biomolecules. In some embodiments, systems, devices, and methods described herein address problems in the art by providing a single system that can be used for gel electrophoresis, electrotransfer and further detection/processing/analysis of biomolecules (such as system for immuno-detection). In some embodiments, systems, devices, and methods described herein address the problems in the art by providing increased throughput for electrophoresis and/or electrotransfer, lower buffer volume requirements and reduced volumes of liquid hazardous waste.

In one embodiment, a device for electrotransfer of biomolecules comprises: at least one receptacle the receptacle comprising: a biomolecule receiving material; a first electrode; and a second electrode, wherein the second electrode is in electrical contact with the material, and is located after and/or distal to and/or posterior to an area where biomolecules are received. In one embodiment, in a device for electrotransfer, the second electrode is located above the material. In one embodiment, in a device for electrotransfer, the second electrode is located along the same plane as the material. In one embodiment, in a device for electrotransfer, the second electrode is located below the material.

In one embodiment, a device for electrotransfer of biomolecules comprises: at least one receptacle the receptacle comprising: a biomolecule receiving material; a first electrode; and a second electrode, wherein the electrodes are arranged to allow current flow in at least two directions, wherein the second direction of current flow is along the plane of the membrane. In one embodiment, in a device for electrotransfer, the first direction of current flow is transverse to the plane of the membrane. In one embodiment, in a device for electrotransfer, the first direction of current flow is diagonal to the plane of the membrane. In one embodiment, in a device for electrotransfer, the first direction of current flow is perpendicular to the plane of the membrane.

In some embodiments, in a device for electrotransfer, the receptacle is a channel, a microfluidic channel, a capillary, a conduit, a flow-path, a surface, a glass slide, a plastic slide, a chamber, a vessel, or a container and includes a channel, a microfluidic channel, a capillary, a conduit, a flow-path, a surface, a glass slide, a plastic slide, placed inside a chamber, a vessel, a container or a receptacle. In some embodiments, a device for electrotransfer comprises a plurality of receptacles. In some embodiments, a receptacle is made of a transparent or a translucent material. In some embodiments a receptacle is completely enclosed. In some embodiments, a receptacle is open on the top. In some embodiments, a receptacle can be closed or enclosed by a removable lid.

In some embodiments a device for electrotransfer according to the present disclosure is a microfluidic device.

In some embodiments, a biomolecule receiving material is placed or coated on the receptacle. A biomolecule receiving material can be comprised of any porous material that can receive a biomolecule and can comprise one or more of the following non-limiting examples including: a membrane, a nitrocellulose, a PVDF (polyvinylidene difluoride), a cellulose acetate, an anodic aluminum oxide, a nylon, a glass fiber, a polyester. A biomolecule receiving material can be comprised of one or more conductive materials embedded in any of the foregoing materials. Some non-limiting examples of a conductive materials that can be embedded in a biomolecule receiving material include tantalum, copper, indium tin oxide, etc. In some embodiments, a biomolecule receiving material comprises one or more ions.

In some embodiments, a biomolecule receiving material has a pore size of from about 0.05 µM-10 µM. Non limiting pore sizes can include, but are not limited to, 0.05 µM, 0.1 µM, 0.15 µM, 0.2 µM, 0.25 µM, 0.3 µM, 0.4 µM 0.45 µM, 0.5 µM, 0.55 µM, 1 µM, 2 µM, 3 µM, 4 µM, 5.0 µM, 6 µM, 7 µM, 8 µM, 9 µM, 10 µM and includes numbers in between. In some embodiments, pore size of a biomolecule receiving material can be different in different areas of the biomolecule receiving material. In some embodiments, a biomolecule receiving has at least two layers. In some embodiments, each layer of the biomolecule receiving material has a different pore size.

In some embodiments of a device of the disclosure, the first electrode is positioned above at least a portion of a biomolecule receiving material. The first electrode, in some embodiments, is further positioned before and/or ahead of an area where biomolecules are received onto the biomolecule receiving material.

In some embodiments of a device of the disclosure, the second electrode is positioned in the same plane as the biomolecule receiving material or is positioned below the biomolecule receiving material or is positioned above the biomolecule receiving material.

In some embodiments of a device of the disclosure, the second electrode is in direct contact with the biomolecule receiving material. In other embodiments of a device of the disclosure, the second electrode is not in direct contact with the biomolecule receiving material.

In some embodiments of a device of the disclosure, at least one of the two electrodes can be physically moved within the receptacle. In some embodiments, the electrodes are positioned such that they do not obscure view of the area where biomolecules are received onto the membrane.

In some embodiments, a device of the disclosure further comprises an ion reservoir. Non-limiting examples of an ion reservoir include: a buffer wick, a buffer, a filter paper with ions, a solid matrix comprising ions or a liquid matrix comprising ions.

In some embodiments of a device of the disclosure, the receptacle further comprises a matrix in which the biomolecules can be electrophoretically separated. In some embodiments, a matrix is positioned above at least a portion of the biomolecule receiving material. In some other embodiments, a matrix is positioned above at least a portion of and in a plane parallel to the biomolecule receiving material. In some other embodiments, the matrix is of a uniform thickness. In some other embodiments, the matrix is of a non-uniform thickness. In some other embodiments, the matrix is of a non-uniform thickness being thin at the posterior end and gradually increasing in thickness toward its anterior end. In some other embodiments, the matrix is of a non-uniform thickness and the matrix is positioned above at least a portion of the biomolecule receiving material. Non-limiting examples of a matrix comprise a polymeric material, a gel, an agarose gel, an acrylamide gel, a polyacrylamide gel, a dextran, or a polyethylene glycol.

In some embodiments a device of the disclosure further comprises a third electrode. In some embodiments a device of the disclosure further comprises a fourth electrode.

Devices of the disclosure can have electrical connections to independently control each electrode. Devices of the disclosure, in some embodiments, comprise at least one electrode can be physically moved. In some embodiments an electrode can be moved past the distal end of the matrix.

In some embodiments of a device of the disclosure, at least one electrode is located past the distal end of the matrix and separated by an insulated area. In some embodiments of a device of the disclosure, at least one of the electrodes is located above at least a portion of the matrix.

In some embodiments of a device of the disclosure, at least one ion reservoir is placed above at least a portion of the matrix. A device of the disclosure in some embodiments comprises a second ion reservoir. The second ion reservoir is located at the distal end of the matrix or is located after the distal end of the matrix. The first or the second ion reservoirs of a device of the disclosure can be physically moved.

In some embodiments of a device of the disclosure, a matrix is a liquid separation matrix. A liquid separation matrix, in non-limiting examples, can comprise a liquid polymeric material, a liquid polyacrylamide, a solution of polyacrylamide, a polyethylene glycol, a mixture of one or more polyethylene glycols, or a dextran, or a quantity of agarose.

In some embodiments, a liquid separation matrix further comprises at least one source of ions. Non-limiting examples of ion source comprises one or more ions selected from glycine, chloride, sodium, sulfate, acetate, and Tris.

In some embodiments of a device of the disclosure, the matrix comprises at least one sample receptacle operable to receive a sample having the biomolecule, the sample receptacle located toward a proximal end of the matrix. Non limiting examples of sample receptacles include a well, a port etc. In non-limiting examples, the depth of the matrix is from about 2 µM to about 2 mm.

In some embodiments, the separation and transfer of biomolecules in the matrix and the biomolecule receiving material is in a horizontal direction.

In some embodiments, the separation and transfer of biomolecules in the matrix and the biomolecule receiving material is in a vertical direction.

In some embodiments, a device of the disclosure further comprises at least one port. A port can additionally comprise at least one seal or sealing mechanism such as but not limited to a resealable plastic seal, a rubber bottle stopper or auto-resealable seals. In some embodiments, a device of the disclosure comprises at least one port that is pierceable and autoresealable.

In some embodiments, a device of the disclosure one port comprises at least one removable plug. Ports in devices of the disclosure can comprise at least one support structure to prevent one or more of the ports from collapsing. A support structure can comprise or be made of a porous structure supporting one or more ports from collapsing. In some embodiments, a support structure that is comprised or made of a porous supporting structure can comprise a gel matrix such as but not limited to agarose.

In some embodiments, a device of the disclosure has at least one port that is operable to receive a sample. In some embodiments, at least one or more ports of a device of the disclosure can be used for one or more of the following including but not limited to: to receive or contain an electrode, add or remove the matrix, add or move an electrode, add a sample to the matrix, add or remove one or more components selected from solutions containing one or more antibodies, solutions containing one or more biomolecule detection reagents, reagents to bind and/or detect biomolecules transferred to the biomolecule receiving material, add or remove one or more buffers and any combinations thereof.

In some embodiments, in a device of the disclosure at least one electrode is located in a port. In some embodiments, a first electrode is located in the sample loading port. In some embodiments, a second electrode is located in a port located at the distal end of the matrix. In some embodiments, a third electrode is located past the distal end of the matrix and is in physical contact with the membrane. In some embodiments, a third electrode is positioned after/posterior to an insulator that is adjacent to the posterior end of the matrix. In some embodiments, a third electrode is positioned posterior to the insulator that is encapsulating the matrix. In some embodiments an insulator is air or a non-conductible material. In some embodiments, the insulator is a non-conductible material such as polycarbonate, nylon, High Density Poly Ethylene (HTPE). In some embodiments, a fourth electrode located above the matrix. In some embodiments, the fourth electrode is further located along the edge of a receptacle such that it does not obstruct the view of the biomolecule receiving material. In some embodiments, the fourth electrode located along the edge of a receptacle. The fourth electrode can, in some embodiments, be separated from the liquid matrix separation media by a thin layer of a porous, higher resistance or lower conductance containing material. In nonlimiting examples the thin layer can have a thickness of 0.1 mm-0.5 mm. Porous materials may include materials such as but not limited to agarose.

In some embodiments, devices of the disclosure are further adapted to perform detection of the biomolecule, by methods such as, but not limited to, immunodetection, colorimetric, chemiluminescence, fluorescence, radiolabel or heavy isotope labelled molecule detection. In some embodiments, devices of the disclosure are further adapted to perform immunodetection, wherein the receptacle further comprises reagent dispensing channels and/or reagents for immuno-detection of the electrotransferred biomolecules.

In some embodiments, a device comprises: one or more of the receptacles, each receptacle comprising: a biomolecule receiving material; a first electrode; a second electrode, wherein the second electrode is in electrical contact with the biomolecule receiving material and is located outside an area where one or more biomolecules are received onto the biomolecule receiving material; and at least a first ion reservoir; a means to move or to position the first electrode and the first ion reservoir above at least a portion of the matrix where the biomolecules are present; and a means to activate and inactivate the first electrode and the second electrode.

In some embodiments, a device comprises: at least one receptacle comprising: a matrix operable to separate one or more biomolecules contained in a sample along the length of the matrix, the matrix having a sample loading area at its anterior end; a biomolecule receiving material, placed in a parallel plane below the matrix; at least a first electrode and a second electrode; the first electrode located above at least a portion of the matrix and positioned anterior to the sample loading area; a second electrode, wherein the second electrode is in electrical contact with the biomolecule receiving material and is located outside an area where biomolecules are received onto the biomolecule receiving material; and at least one ion reservoir, wherein the first and the second electrode can be activated and inactivated, and wherein the first electrode and a first ion reservoir can be moved or positioned onto at least a portion of the top of the matrix, and wherein the second electrode and a second ion reservoir c can be moved or positioned past the distal end of the matrix such that the second electrode and the second ion reservoir are electrically connected to the biomolecule receiving material.

In some embodiment, a device comprises: at least one receptacle comprising: a matrix operable to separate biomolecules along its length, the matrix having the sample loading area at its anterior end; a biomolecule receiving material, placed in a parallel plane below the matrix; at least a first electrode, a second electrode and a third electrode; the first electrode located above at least a portion of the matrix and positioned anterior to the sample loading area; the second electrode located above at least a portion of the matrix and positioned near the posterior end of the matrix; the third electrode in electrical contact with the biomolecule receiving material and positioned after the posterior end of the matrix; and at least one ion reservoir. In some embodiments, the first and the second and the third electrode can be activated and inactivated.

In some embodiment, a device comprises: at least one receptacle comprising: a matrix operable to separate the biomolecules along its length, the matrix having the sample loading area at its anterior end; a biomolecule receiving material, placed in a parallel plane below the matrix; at least a first electrode, a second electrode, a third electrode and a fourth electrode; the first electrode located above at least a portion of the matrix and positioned anterior to the sample loading area; the second electrode positioned toward the posterior end of the matrix; the third electrode in electrical contact with the biomolecule receiving material and positioned after the posterior end of the matrix; the fourth electrode located above the matrix; and at least one ion reservoir. In some embodiments, the first and the second and the third and the fourth electrode can be activated and inactivated.

Some embodiments describe devices having a liquid matrix and a vertical orientation. One exemplary device comprises a receptacle enclosed on at least three sides having two ports, a biomolecule receiving material placed on (inside) one side of the receptacle. At least one port is sealed with a removable plug (the seal forming one part of the enclosure of the receptacle). At least one port is a pierceable and auto-sealable port that can be used to fill a liquid matrix into the receptacle. This port can be used to fill liquid matrix into the receptacle. Receptacle of this device further comprises an electrode adjacent to an insulator to compartmentalize and/or create an enclosure for the liquid matrix and at least one electrode adjacent to a resealable port.

Another embodiment of a vertical orientation of a device of the disclosure which has a receptacle having two ports, and a biomolecule receiving material, placed on (inside) one side of the receptacle. The first port is operable to be sealed with a removable plug (the seal forming one part of the enclosure of the receptacle) and is located vertically above the second port. A first electrode can be placed on top of the removable plug and may have a buffer wick below it to make contact with the receptacle. The second port is a pierceable and auto-sealable port and comprises an electrode (second electrode) in it. This port can be used to fill a liquid matrix into the receptacle. Liquid matrix is filled up to the first port and the plug is used to seal the first port located on the top. The receptacle of this device further comprises an electrode (third electrode) placed adjacent to an insulator and another electrode (fourth electrode) located on or in a side wall of the receptacle on the side opposite to the biomolecule receiving material.

The present disclosure describe devices for electrophoresis, electrotransfer and detection of a biomolecule, wherein the device comprises: at least one receptacle comprising: a layer of matrix operable to separate the biomolecules along its length, the matrix having at least one port; a biomolecule receiving material, placed in a parallel plane below the matrix; a first electrode in electrical contact with the matrix and positioned anterior to the port or in the port; a second electrode positioned after the matrix, the second electrode in electrical contact with the biomolecule receiving material; a third electrode in electrical contact with the matrix and positioned after the biomolecule receiving area; a fourth electrode located above at least a portion of the matrix. In some embodiments, the port can receive a sample and can (later) receive one or more reagents for detection of the biomolecule. Alternatively, detection reagents can be layered on the layer of the matrix and can migrate through the matrix to reach the biomolecules on the biomolecule receiving material. In some embodiments the device has a single port. In some embodiments, the layer of matrix is a thin layer. In some embodiments the thin layer can be from about $20\,\mu M$ to $200\,\mu m$ and in some embodiments is about $100\,\mu m$.

In some embodiments, the disclosure provides systems for electrophoresis and electrotransfer. In some embodiments, the disclosure provides systems for electrophoresis, electrotransfer and detection (such as but not limited to immunodetection). Systems of the disclosure can be microfluidic systems or comprise microfluidic components. Devices and systems of the disclosure can additionally have detection and imaging capabilities to detect and image electrophoresis, electrotransfer and/or immunodetection during (in real time) and after completion.

Some embodiments relate to systems comprising: any device of the disclosure as described herein further comprising one or more of the following: an instrument or a dock that can provide a power-supply; a means to activate and/or inactivate electrodes; capillaries; tubing's; channel; microchannels; pumps; valves; robotic arms or motors; means to regulate electrode movement/repositioning; means for dispensing and/regulating flow of reagents; software components to regulate release/timed release of reagents and/or to regulate electrode activation/inactivation and/or to regulate electrode movement/repositioning during operation.

Embodiments of the disclosure relate to methods of performing electrotransfer or gel electrophoresis and electrotransfer using the devices and systems described herein. Biomolecules that can be electrophoreses and/or electrotransferred by devices and methods described herein include proteins, peptides, glycoproteins, phosphoproteins, nucleic acid, DNA, or RNA.

In one embodiment, a method of performing electrotransfer of biomolecules comprises: 1) positioning a matrix comprising one or more biomolecules that have been separated based on their molecular weight or charge into or on top of a receptacle of a device, the device comprising: one or more of the receptacles, each receptacle comprising: a biomolecule receiving material; a first electrode; and a second electrode, wherein the second electrode is in electrical contact with the biomolecule receiving material and is located outside an area where biomolecules are received onto the biomolecule receiving material; 2) performing electrotransfer of the biomolecules from the matrix into the biomolecule receiving material comprising: (i) positioning the first electrode and a first ion reservoir above at least a portion of the matrix where the biomolecules are present; (ii) activating the first electrode and the second electrode thereby enabling transfer of the biomolecules onto the biomolecule receiving material.

In one embodiment, a method of performing electrotransfer of biomolecules comprises: 1) positioning a matrix comprising one or more biomolecules that have been separated based on their molecular weight or charge into or on top of a receptacle of a device, the device comprising: one or more of the receptacle, each receptacle comprising: a biomolecule receiving material; a first electrode; and a second electrode, wherein the electrodes are arranged to allow current flow in at least two directions, wherein the second direction of current flow is along the plane of the biomolecule receiving material; 2) performing electrotransfer of the biomolecules from the matrix into the biomolecule receiving material comprising: (i) positioning the first electrode and a first ion reservoir above at least a portion of the matrix where the biomolecules are present; (ii) activating the first electrode and the second electrode thereby enabling transfer of the biomolecules onto the biomolecule receiving material.

In one embodiment, a method of performing electrophoresis and electrotransfer of biomolecules comprises: 1) loading a sample comprising one or more biomolecules into a sample loading area of a device, the device comprising (i.e., for example a device having 2 electrodes with option to mechanically move the electrodes), at least one receptacle comprising: a matrix operable to separate the biomolecules along its length, the matrix having the sample loading area at least a first electrode and a second electrode; the first electrode located above at least a portion of the matrix and positioned anterior to the sample loading area; a second electrode, wherein the second electrode is in electrical contact with the biomolecule receiving material and is located outside an area where biomolecules are received onto the biomolecule receiving material; and at least one ion reservoir; 2) performing electrophoresis of the biomolecules in the matrix by activating both the electrodes; 3) inactivating the first and second electrodes to stop the electrophoresis; and 4) performing electrotransfer of the biomolecules from the matrix onto the biomolecule receiving material by: (i) moving/positioning the first electrode and a first ion reservoir onto at least a portion of the top of the matrix; (ii) moving/positioning the second electrode and a second ion reservoir past the distal end of the matrix such that the second electrode and the second ion reservoir are electrically connected to the biomolecule receiving material; (iii) activating the first electrode and the second electrode, enabling transfer of the biomolecule from the matrix into the biomolecule receiving material; and (iv) inactivating the first and second electrodes to stop the electrotransfer once complete.

In another embodiment, a method of performing electrophoresis and electrotransfer of biomolecules comprises: 1) loading a sample comprising one or more biomolecules into a sample loading area of a device, the device comprising (i.e., for example a device having 2 electrodes with option to mechanically move the electrodes), at least one receptacle comprising: a matrix operable to separate the biomolecules along its length, the matrix having the sample loading area at least a first electrode and a second electrode; the first electrode located above at least a portion of the matrix and positioned anterior to the sample loading area; a second electrode, wherein the second electrode in electrical contact with the biomolecule receiving material and positioned after the distal end of the matrix; and at least one ion reservoir; 2) performing electrophoresis of the biomolecules in the matrix by activating both the electrodes; 3) inactivating the first and second electrodes to stop the electrophoresis; and 4) performing electrotransfer of the biomolecules from the matrix onto the biomolecule receiving material by: (i) moving/positioning the first electrode and a first ion reservoir onto at least a portion of the top of the matrix; (ii) moving/positioning the second electrode and a second ion reservoir past the distal end of the matrix such that the second electrode and the second ion reservoir are electrically connected to the biomolecule receiving material; (iii) activating the first electrode and the second electrode, enabling transfer of the biomolecule from the matrix into the biomolecule receiving material; and (iv) inactivating the first and second electrodes to stop the electrotransfer once complete.

In another embodiment, a method of performing electrophoresis and electrotransfer of biomolecules comprises: 1) loading a sample having the biomolecule into a sample loading area in the matrix in a device of the disclosure (such as for example a device having 3 electrodes), the device comprising: at least one receptacle comprising: a matrix operable to separate the biomolecules along its length, the matrix having the sample loading area at its anterior end; a biomolecule receiving material, placed in a parallel plane below the matrix; at least a first electrode, a second electrode and a third electrode; the first electrode located above at least a portion of the matrix and positioned anterior to the sample loading area; the second electrode located above at least a portion of the matrix and positioned near the posterior end of the matrix; the third electrode in electrical contact with the biomolecule receiving material and positioned after the posterior end of a matrix that is insulated and separated from the third electrode; at least one ion reservoir adjacent to at least one of the electrodes; 2) performing electrophoresis of the sample in the matrix by activating the first and second electrodes; 3) inactivating the first and second electrodes to stop electrophoresis after the biomolecules are resolved; 4) performing electrotransfer of the biomolecule from the matrix onto the biomolecule receiving material by reactivating the first electrode and activating the third electrode wherein the third electrode is in electrical contact with the biomolecule receiving material; and 5) inactivating the first and third electrodes to stop the electrotransfer once complete.

In another embodiment, a method of performing electrophoresis and electrotransfer of biomolecules Comprises: 1) loading a sample or a plurality of samples having the biomolecule into a sample loading port of a device comprising (such as a device with 4 electrodes): at least one receptacle comprising: a matrix operable to separate the biomolecules along its length, the matrix having the sample loading area at its anterior end; a biomolecule receiving material, placed in a parallel plane below the matrix; at least a first electrode, a second electrode, a third electrode and a fourth electrode; the first electrode located above at least a portion of the matrix and positioned anterior to the sample loading area; the second electrode positioned toward the posterior end of the matrix; the third electrode in electrical contact with the biomolecule receiving material and positioned after the posterior end of a matrix that is insulated and separated from the third electrode; the fourth electrode located above the matrix; the fourth electrode located above the matrix and separated from latter by a transparent material with higher resistance compared to electrode material; and at least one ion reservoir; 2) performing electrophoresis of the samples in the matrix by activating the first electrode and the second electrode; 3) inactivating the first and second electrodes to stop the electrophoresis when complete; 4) performing electrotransfer of the biomolecule from the matrix into the biomolecule receiving material by: (i) activating the third electrode and the fourth electrode; and 5) inactivating the third and fourth electrodes when the electro transfer is completed. In non-limiting examples, a material separating the matrix and the fourth electrode can comprise agarose or another gel or an agarose-like material is from about 0.1 mm-5 mm thick. In some embodiments of a method as described here, the third electrode is further located along the edge of a receptacle such that it does not obstruct the view of the biomolecule receiving material from either side of the device.

In some embodiments of the methods of the disclosure, variously set forth in sections above, a device used comprises a plurality of receptacles and a plurality of samples are loaded one into the sample loading area of each receptacle. In some embodiments, the biomolecules to be electrophoresed and/or to be electrotransferred, are stained prior to being loaded. the biomolecules are pre-stained.

In some embodiments of the methods of the disclosure, variously set forth in sections above, biomolecules can be visualized while being electrophoresed and electrotransferred. In some embodiments, methods of the disclosure can comprise visualizing the biomolecules during or at the end of the electrophoresis steps and or the electro transfer steps by viewing the device from the top. In some embodiments, methods of the disclosure can further comprise imaging the biomolecules during or at the end of the electrophoresis steps and or the electro transfer step.

In various embodiments of the methods described herein, a sample loading area is a sample port on a device of the disclosure. In some embodiments, a sample loading port is supported by a molecule permeable physical barrier such as one made of agarose. In some embodiments, a sample loading port opens into a microfluidic insert receiving biomolecules. In some embodiments, a sample is loaded into the sample port after removing a plug located therein.

Systems, devices, cassettes and methods of the disclosure, advantageously result in one or more of the foregoing including: one device/system for electrophoresis and electrotransfer, ability to conduct high throughput electrophoresis and/or electrotransfer of biomolecules at the same time, reduced number of devices or components, reduced cost, reduced accessories, reduced footprint of equipment needed, reduced space for storage of systems and devices, no buffer spillage, leakage, reduced amount of gels, biomolecule receiving materials, samples, buffers and other components used, and reduced liquid hazardous waste as compared to existing systems and devices for electrophoresis or electrotransfer.

These and other features of the present teachings will become more apparent from the detailed description in sections below.

BRIEF DESCRIPTION OF THE DRAWINGS

One or more embodiments of the present disclosure may be better understood in reference to one or more the drawings below. The skilled artisan will understand that the drawings, described below, are for illustration purposes only. The drawings are not intended to limit the scope of the present teachings in any way.

FIGS. 4A and 4B show side views of an exemplary electrotransfer devices of the disclosure and results of electrotransfer using the devices, according to one embodiment;

FIG. 5, panels a.-e., are side views of an exemplary electrophoresis and electrotransfer system of the disclosure, according to one embodiment;

Figure 1:
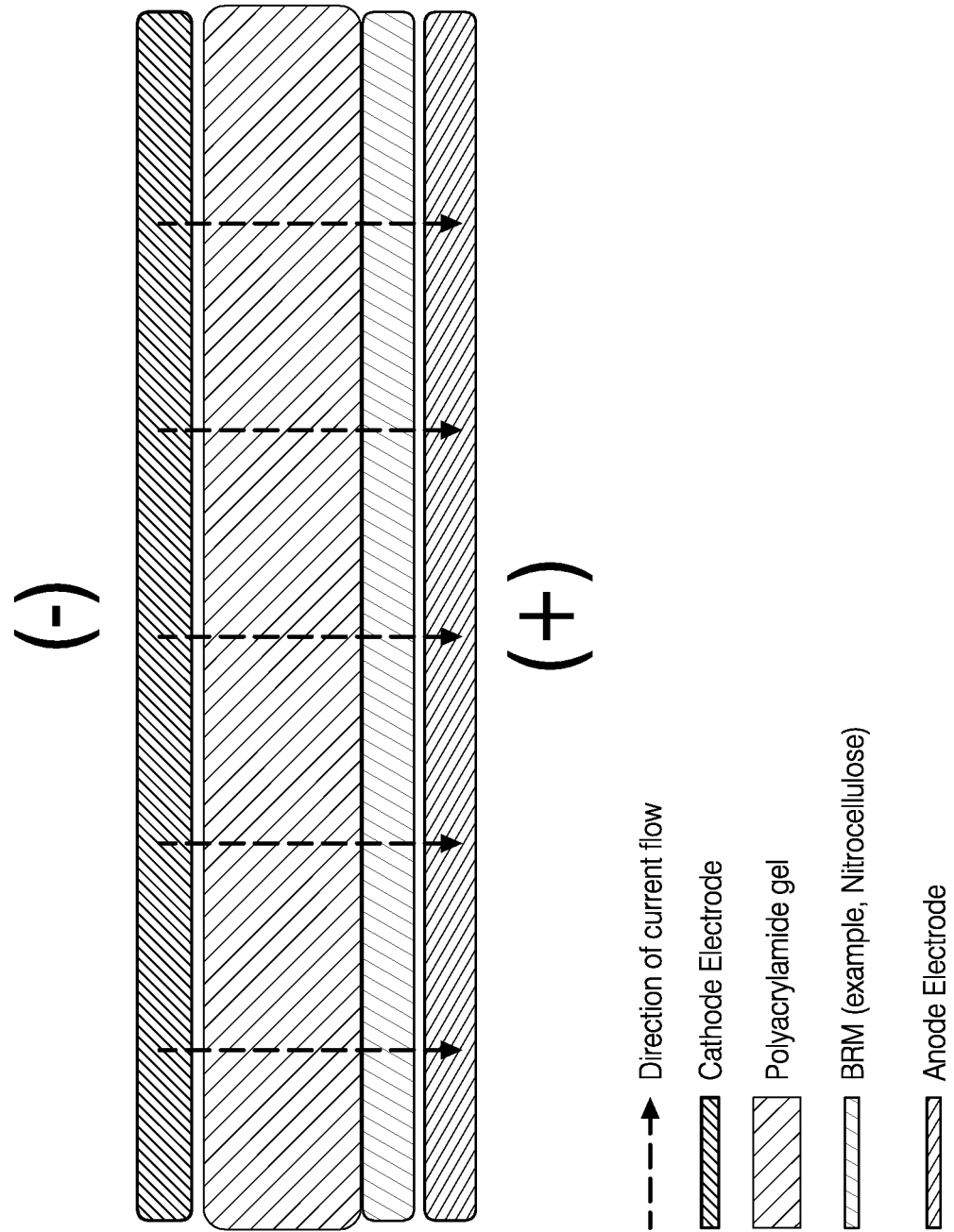
FIG. 1 is a schematic representation arrangement of components in a prior art system, that can be used to perform electrotransfer and/or electrophoresis.

DETAILED DESCRIPTION OF THE
DISCLOSURE & EXAMPLES

It is to be understood that both the foregoing general description and the following detailed description are exemplary and explanatory only and are not intended to limit the scope of the current teachings. In this application, the use of the singular includes the plural unless specifically stated otherwise. For example, the singular forms "a", "an" and "the" as used in the specification also include plural aspects unless the context dictates otherwise. Similarly, any singular term used in the specification also mean plural or vice versa unless the context dictates otherwise.

Also, the use of "comprise", "contain", and "include", or modifications of those root words, for example but not limited to, "comprises", "contained", and "including", are not intended to be limiting. Use of "or" means "and/or" unless stated otherwise. The term "and/or" means that the terms before and after can be taken together or separately. For illustration purposes, but not as a limitation, "X and/or Y" can mean "X" or "Y" or "X and Y".

Whenever a range of values is provided herein, the range is meant to include the starting value and the ending value and any value or value range therebetween unless otherwise specifically stated. For example, "from 0.2 to 0.5" means 0.2, 0.3, 0.4, 0.5; ranges therebetween such as 0.2-0.3, 0.3-0.4, 0.2-0.4; increments there between such as 0.25, 0.35, 0.225, 0.335, 0.49; increment ranges there between such as 0.26-0.39; and the like.

The term "or combinations thereof" as used herein refers to all permutations and combinations of the listed items preceding the term. For example, "A, B, C, or combinations thereof" is intended to include at least one of: A, B, C, AB, AC, BC, or ABC, and if order is important in a particular context, also BA, CA, CB, ACB, CBA, BCA, BAC, or CAB. Continuing with this example, expressly included are combinations that contain repeats of one or more item or term, such as BB, AAA, AAB, BBC, AAABCCCC, CBBAAA, CABABB, and so forth. The skilled artisan will understand that typically there is no limit on the number of items or terms in any combination, unless otherwise apparent from the context.

Described herein are systems, devices, and methods for electrophoresis and/or electrotransfer and/or detection of biomolecules. Some embodiments describe systems for transfer/blotting (western, northern, southern blotting) and detection of biomolecules. Systems, devices and methods of the present disclosure overcome several of the problems in the art. In some embodiments, systems and/or devices that can be used for electrotransfer are described. In some embodiments, systems and/or devices that can be used for both gel electrophoresis and electrotransfer are described. In some embodiments, systems and/or devices that can be used for both gel electrophoresis and electrotransfer and detection of transferred biomolecule (such as by immune detection) are described. Accordingly, systems of the present disclosure provide a single instrument platform for conducting two different biomolecule analysis methods.

Accordingly, systems, devices, cassettes and methods of the disclosure, advantageously result in at least one or more of the foregoing benefits as compared to existing systems and devices for electrophoresis and/or electrotransfer and/or including: one system or platform for electrophoresis, electrotransfer and detection of biomolecules; ability to conduct multiple electrophoresis and/or electrotransfer and/or procedures in a single device by processing biomolecules in two or more gels or transfer membranes at the same time thereby providing increased throughput for electrophoresis and electrotransfer and/or immunodetection; providing a simple device with a small footprint; not requiring complicated robotic instrumentation; reduced number of devices or parts or components, reduced cost, reduced footprint for equipment storage, reduced spillage, reduced leakage, reduced clean-up, reduced amount of buffers and reagents used and reduced liquid hazardous waste (such as methanol in transfer buffer waste as compared to existing systems and devices for electrophoresis and/or electrotransfer).

The section headings used herein are for organizational purposes only and are not to be construed as limiting the subject matter described in any way. All literature and similar materials cited in this application including, but not limited to, patents, patent applications, articles, books, treatises, and internet web pages, regardless of the format of such literature and similar materials, are expressly incorporated by reference in their entirety for any purpose. In the event that one or more of the incorporated literatures and similar materials defines or uses a term in such a way that it contradicts that term's definition in this application, this application controls. While the present teachings are described in conjunction with various embodiments, it is not intended that the present teachings be limited to such embodiments. On the contrary, the present teachings encompass various alternatives, modifications, and equivalents, as will be appreciated by those of skill in the art in light of the present teachings.

Figures and drawings provided in this specification will be used to describe exemplary embodiments. One of skill in the art will note that the drawings and examples are merely for illustration of ideas and concepts and are not intended to limit the scope of the present teachings in any way. All parts are not labeled in each figure and, unless noted, similar parts have similar numbering which may not be described in each figure or every part of the description.

I. Systems and Devices

Embodiments of the present disclosure describes systems and devices that can be used for at least one or more of the following: gel electrophoresis, electrotransfer and detection. Devices of the disclosure comprise one or a plurality of receptacles in which electrophoresis, electrotransfer and/or detection of biomolecules can be carried out. A receptacle of the present devices/systems include but are not limited to: a channel, a microfluidic channel, a capillary, a conduit, a flow-path, a surface, a glass slide, a plastic slide, a chamber, a vessel, or a container and also include containers/receptacles/vessels/slides in or on which one or more of a plurality of channels, or microfluidic channels, or capillaries, or conduits, or flow-paths, can be comprised. The terms receptacle, conduit, flow-path, channel, microfluidic channel, surface, glass slide, plastic slide, chamber, vessel, or container are interchangeably used in this specification. Flow-paths in some embodiments can comprise gels. In some embodiments, a device for electrotransfer comprises a plurality of receptacles. In some embodiments, a receptacle is made of a transparent material. In some embodiments a receptacle is completely enclosed. In some embodiments, a receptacle is open on the top. In some embodiments, a receptacle can be closed or enclosed by a removable lid.

Receptacles, including but not limited to, channels, conduits, flow-paths, microfluidic channel, surfaces glass slide, plastic slide, chamber, vessel, or containers can be any suitable shape, size, or configuration and can be formed from any suitable material (e.g., glass, plastic, silicon, fused silica, gel, PYEX™ (amorphous glass), and/or the like). For example, in some embodiments, receptacles can define a lumen having a diameter of about 30 micrometers ($\mu m$) to about 3000 $\mu m$. In other embodiments, a receptacle can include capillaries, channels, or microchannels that define a lumen having a diameter of about 2.5 $\mu m$ to about 400 $\mu m$. The size of lumen diameter can be based at least in part on the sample and/or the sample volume. For example, a lumen with a relatively small diameter uses a relatively low sample volume, which can be suitable for expensive samples or reagents, whiles a lumen with a relatively large diameter uses a relatively high sample volume and can result in improved signal detection. In some embodiments, the length of the receptacles including any capillaries, channels etc. can be based at least in part on factors such as sample size and the extent of sample separation required to resolve the biomolecule of interest. In some embodiments, receptacles can have a length of from about 2 cm to 20 cm. In some embodiments, receptacles/channels can have a length of less than 2 cm. In some embodiments, receptacles/channels can have a length of about 3 cm, 4 cm, 5 cm, or 6 cm, or more. In some embodiments, the use of longer receptacles/channels can result in better separation of samples and improved resolution of complex mixtures and/or when resolving a low abundance biomolecule.

Devices of the present disclosure are not limited to any size and can be scaled up or down to accommodate any need for electrophoresis or electrotransfer or detection.

In some embodiments, devices of the disclosure are microfluidic devices. A microfluidic device typically refers to a device that can contain and/or process and/or or handle microvolumes of reagents, for example samples or reagents of less than 1 $\mu l$, less than 500 nl and/or between 1 nl and 10 nl, may be introduced into the device. Fluids include liquids, gels, matrices, semi-solids, suspensions of particulates in liquids. Microfluidic devices of the disclosure comprise in various embodiments one of more of a biomaterial receiving material, a matrix, an ion reservoir, one or more electrodes, buffers, wash solutions, and/or detection reagents.

Microfluidic devices typically comprise channels that form boundaries for a fluid flow. A "channel," as used herein, relates a feature on or in a substrate that at least partially directs the flow of a fluid. In some cases, the channel may be formed, at least in part, by a single component, e.g., an etched substrate or molded unit. A channel can have any cross-sectional shape, for example, circular, oval, triangular, irregular, square or rectangular (having any aspect ratio), or the like, and can be covered or uncovered (i.e., open to the external environment surrounding the channel). Covers can be removed to access certain components (for example, a biomolecule receiving material with biomolecules transferred can be removed from a microfluidic device and processed separately). Covers can be removed to dispense reagents or components. In embodiments where the channel is completely covered, at least one portion of the channel can have a cross-section that is completely enclosed, and/or the entire channel may be completely enclosed along its entire length with the exception of its inlet and outlet. Additional features of a microfluidic device can include one or more of chambers for reagents (pre-filled or to be filled by user), inlet ports, microchannels, detection chambers, outlet ports through which fluid may flow, waste receptacles, valves, pumps, electrodes, electrical connections and the like.

In some embodiments, a microfluidic device of the disclosure is transparent on top. A substrate from which a microfluidic device is made can be transparent and can be covered with a material having transparent properties, such as a glass coverslip, to permit detection of a reporter, for example, by an optical device such as an optical microscope. The material can be perforated for functional interconnects, such as fluidic, electrical, and/or optical interconnects, and sealed to the back interface of the device so that the junction of the interconnects to the device is leak-proof. Such a device can allow for application of high pressure to fluid channels without leaking. In some embodiments, a microfluidic device of the disclosure can have dimension of ranging between about 0.5 cm to about 15 cm per side and about 1 micron to about 1 cm in thickness. In some embodiments, a microfluidic device of the disclosure can have dimension of from about 6 cm in length, to about 6 cm in width, and about 2 mm thick.

A biomolecule receiving material (such as nitrocellulose, PVDF etc.) can be coated or adhered onto a channel or receptacle of a microfluidic device of the disclosure. In some embodiments, multiple layers of biomolecule receiving material can be coated. In one non-limiting example, a first layer of a biomolecule receiving material can bind to a biomolecule (such as proteins) and a second layer of a biomolecule receiving material cab be to facilitate passage of electric current. On one example embodiment, the first layer (located on the top) could be from about 10 um thick and have a biomolecule receiving material having a pore size of 0.2 $\mu m$ or 0.45 $\mu m$ to allow binding of proteins. A second layer of about 10 $\mu m$ thickness with a 5 $\mu m$ pore size just below the first layer can enhance electrical conductivity of the nitrocellulose to facilitate flow of electrical current for electrotransfer (and/or electrophoresis).

1) Devices for Electrophoresis and/or Electrotransfer and/or Detection:

FIG. 1 is a schematic representation of placement of components of a typical prior art device, that can be used to perform electrotransfer where two electrodes, a cathode and an anode enclose a matrix (typically a gel shown as a polyacrylamide gel) on which there are electrophoresed biomolecules (either electrophoresed in the same device or in a different device), and a biomolecule receiving material (such as nitrocellulose/PVDF membrane) onto which electrophoresed biomolecules are transferred. Location of an anode in prior art devices is generally below the cathode with the matrix and membrane sandwiched in between as depicted in FIG. 1.

The present disclosure, in one embodiment, describes a device for electrotransfer of biomolecules comprising: at least one receptacle the receptacle comprising: a biomolecule receiving material; a first electrode; and a second electrode, wherein the second electrode is in electrical contact with the biomolecule receiving material, and is located after and/or distal-to and/or posterior-to an area where biomolecules are received. FIGS. 2A, 2B, 2C and 2D depict some exemplary components of electrotransfer devices of the disclosure that are placed in one or more receptacles and depict the placement of various components as well as the flow of electrical current in these exemplary devices.

While the descriptions and drawings are in relation to one exemplary type of a biomolecule receiving material, a matrix, a particular conductive material for an electrode and the like it is to be understood the devices of the disclosure are not limited to these examples and other materials can be substituted.

Figure 2A:
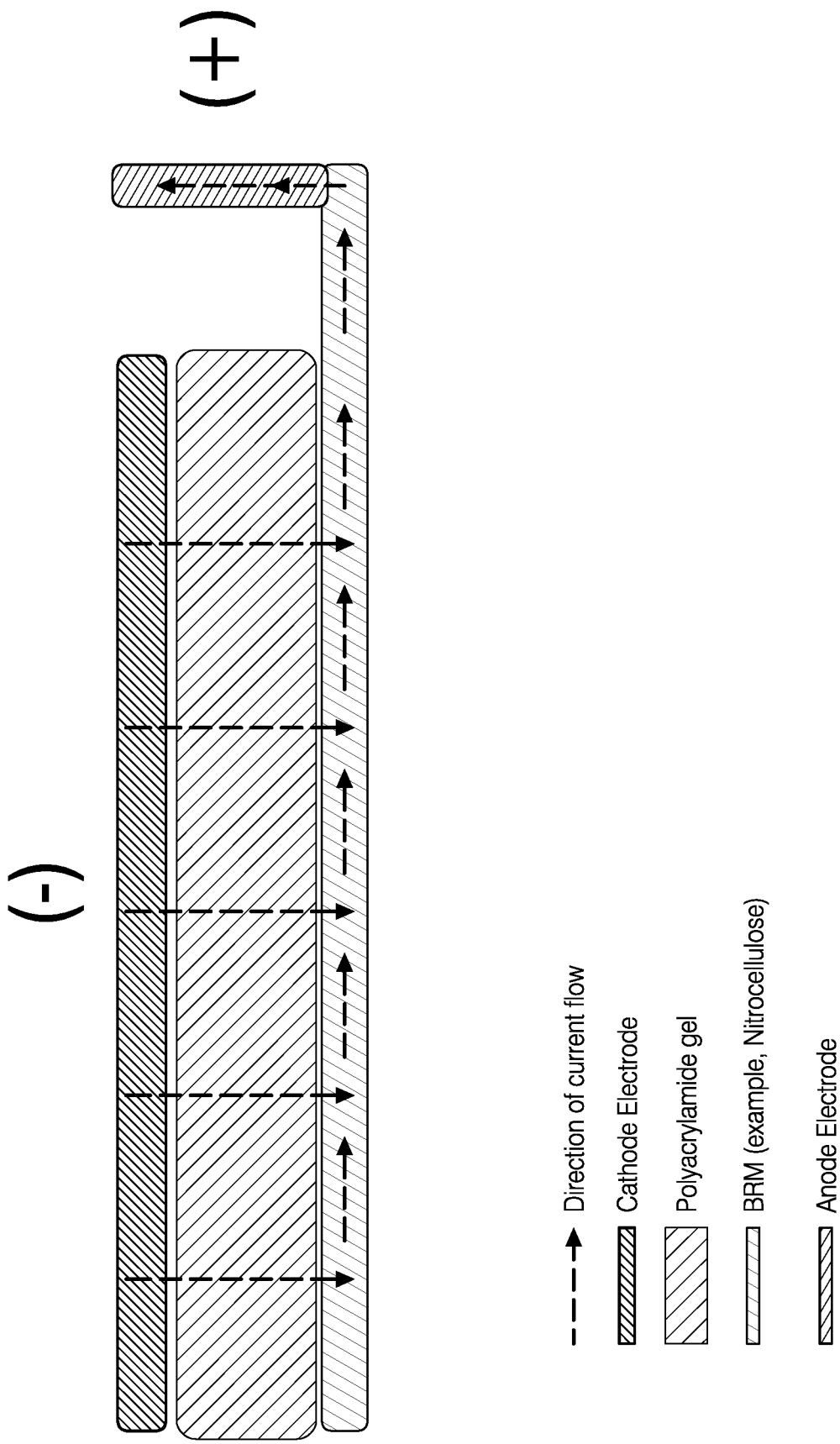
FIGS. 2A-2D is a schematic representation of four exemplary arrangement of components in devices/system of the disclosure, that can be used to perform electrophoresis and/or electrotransfer and/or detection, wherein FIG. 2A. shows the placement of various components of and direction of flow of electric current according to one embodiment, wherein FIG. 2B. shows the placement of various components and direction of flow of electric current according to another embodiment, wherein FIG. 2C. shows the placement of various components and direction of flow of electric current according to yet another embodiment; and wherein FIG. 2D. shows the placement of various components and direction of flow of electric current according to yet another embodiment.

FIG. 2A depicts one embodiment of placement of some components of an electrotransfer, device where the first electrode (depicted as a cathode for comparison to FIG. 1) is located on top of a matrix and a biomolecule receiving material and where the second electrode (depicted as an anode for comparison to FIG. 1), is located above and in electrical contact with the biomaterial receiving material.

Figure 2B:
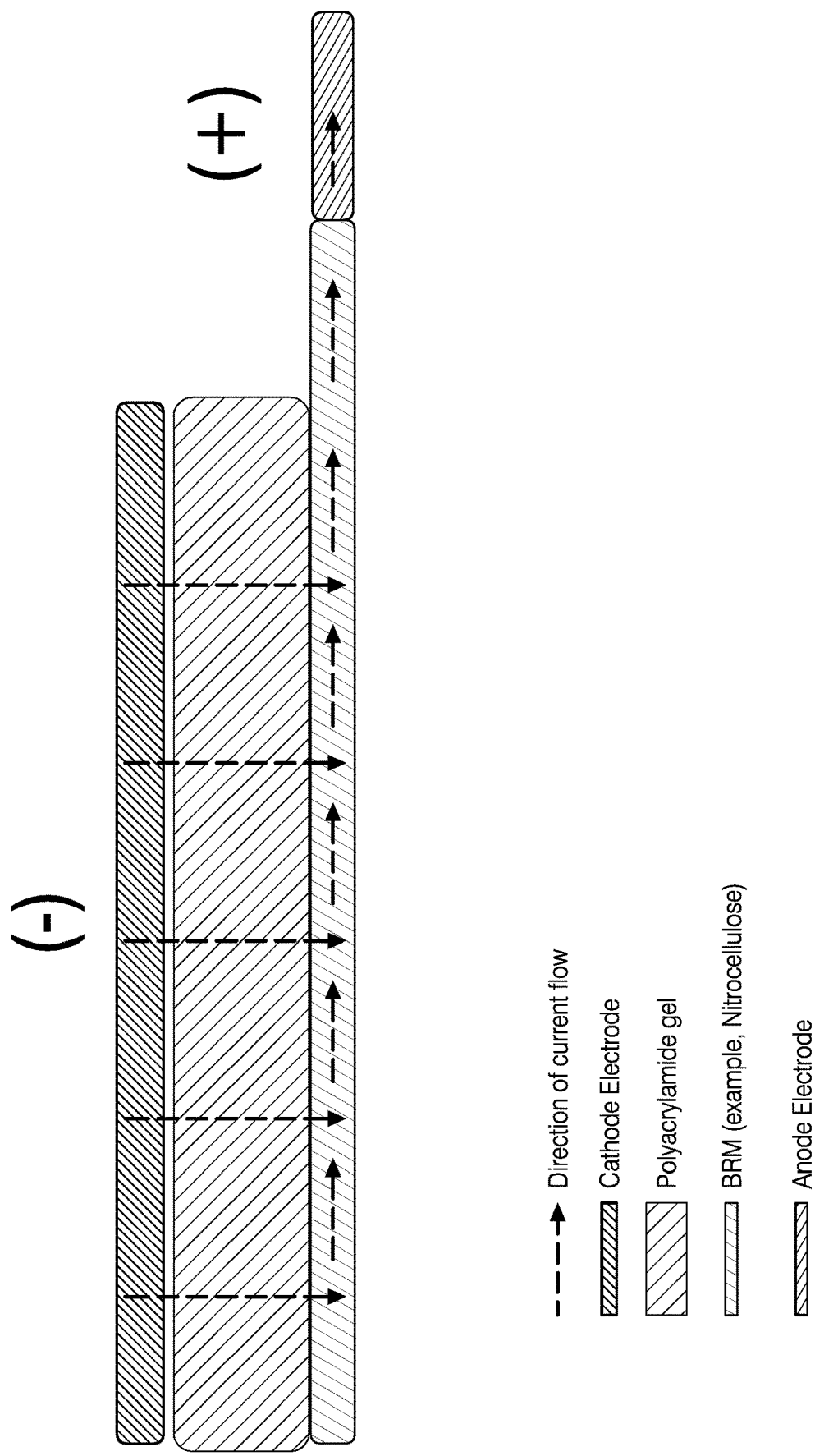

FIG. 2B depicts another embodiment of placement of some components, where the first electrode (for example, a cathode) is located on top of a matrix and a biomolecule receiving material and wherein the second electrode (for example, an anode), is located along the same plane as the biomolecule receiving material and in electrical contact with the biomaterial receiving material.

Figure 2C:
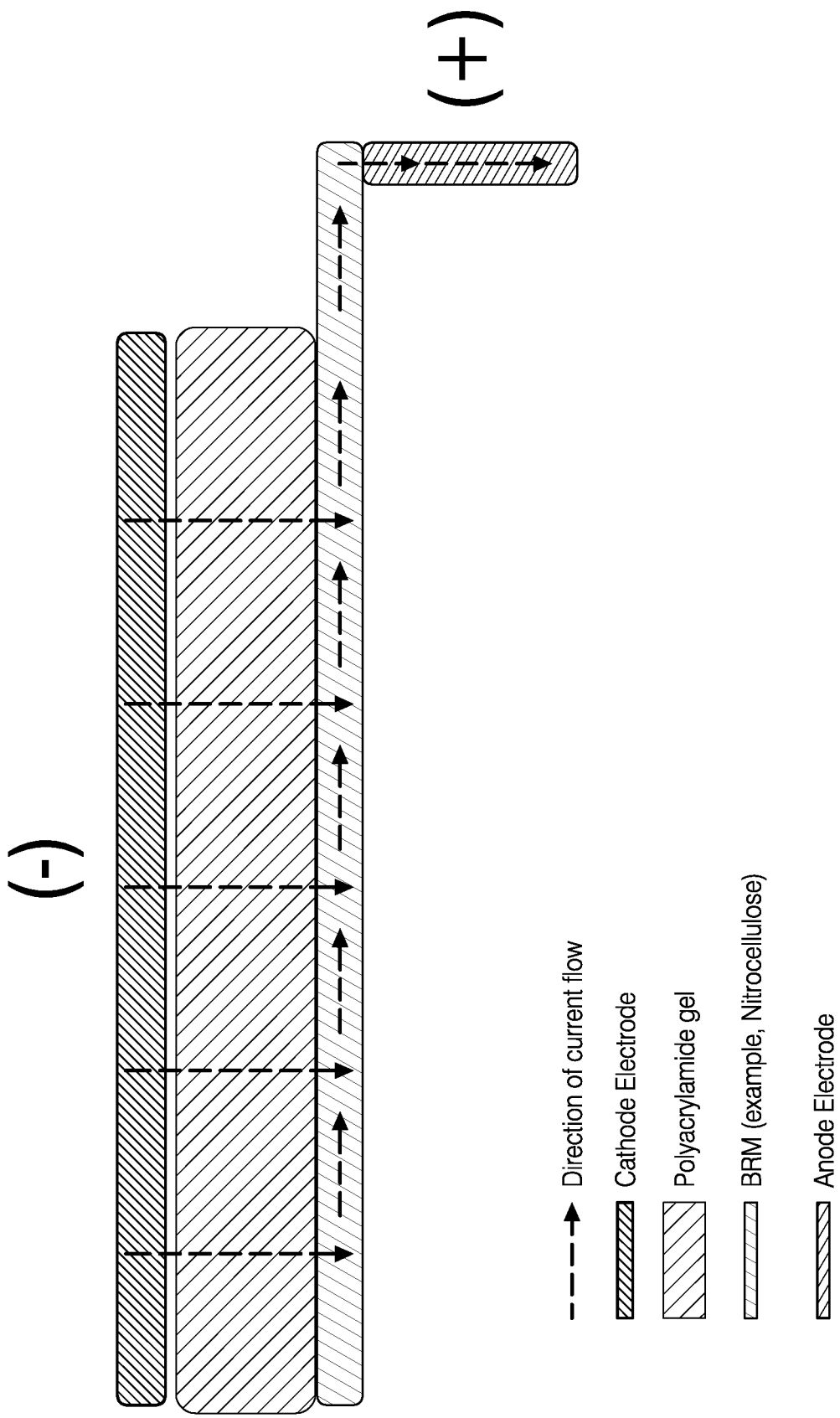

FIG. 2C. depicts yet another embodiment of placement of some components, where the first electrode (for example, a cathode) is located on top of a matrix and a biomolecule receiving material and wherein the second electrode (for example, an anode), is located below the biomolecule receiving material and in electrical contact with the biomaterial receiving material.

Figure 2D:
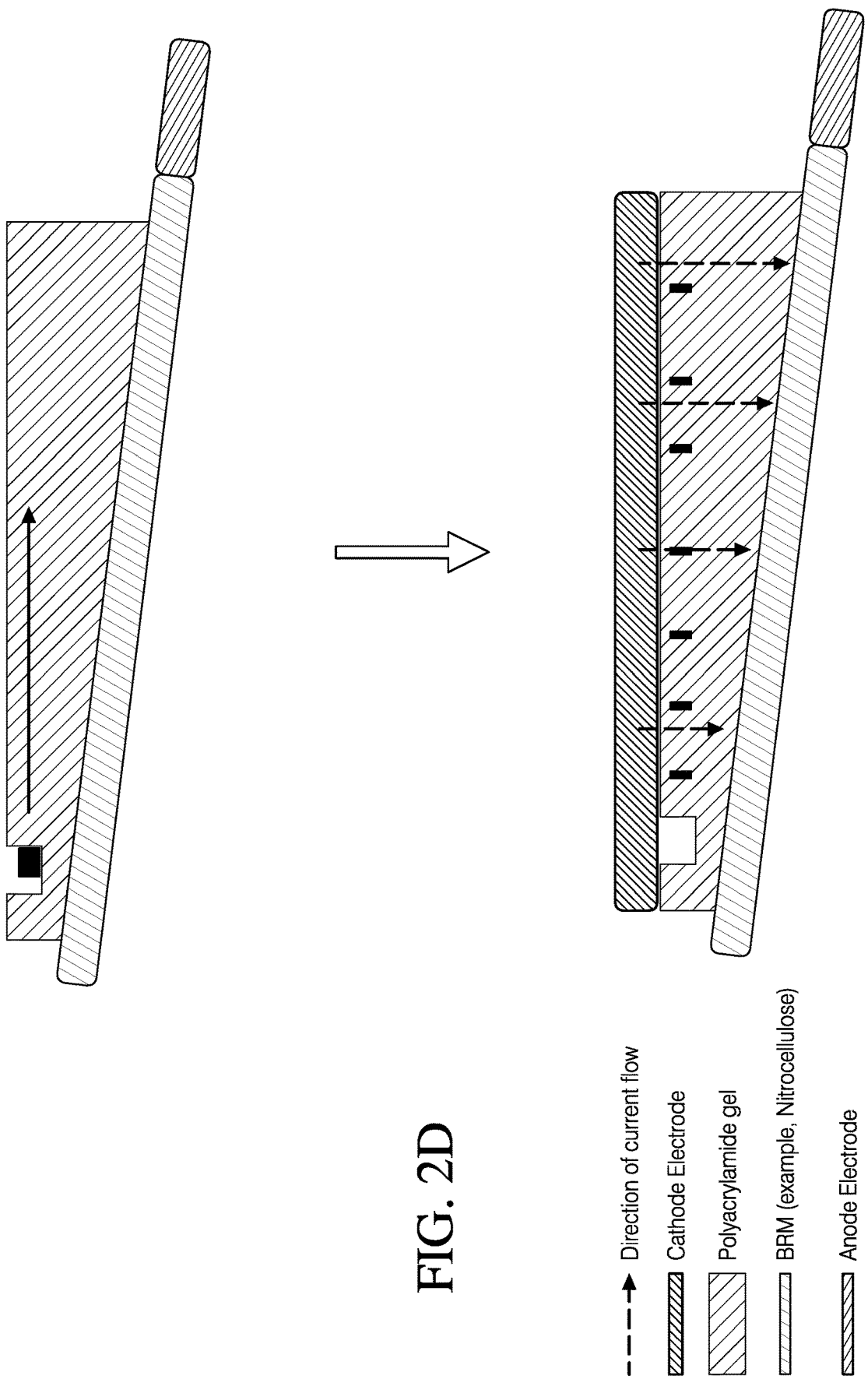

FIG. 2D. depicts another embodiment of placement of some components, wherein the biomolecule receiving material is not placed in a parallel plane below the matric. In some embodiments, the matrix is thicker on one side. While not being limited to any theory, a matrix thicker on one side (such as on the right side as depicted in FIG. 2D), in some embodiments, generates a substantially uniform transfer of proteins of all molecular weights, since smaller proteins that electrophoresis further down the gel would electrotransfer faster to the biomolecule receiving material. Accordingly, a thicker gel to transfer can normalize the speed of transfer relative to the slower migrating high MW proteins at the left of the arrangement shown in FIG. 2D. As shown in FIG. 2D, the first electrode (for example, a cathode) is located on top of a matrix having a non-uniform thickness below which is a biomolecule receiving material and wherein the second electrode (for example, an anode), is located along the same plane as the biomolecule receiving material and in electrical contact with the biomaterial receiving material.

In another embodiment of the present disclosure, a device for electrotransfer of biomolecules comprises: at least one receptacle, the receptacle comprising: a biomolecule receiving material; a first electrode; and a second electrode, wherein the electrodes are arranged to allow current flow in at least two directions, wherein the second direction of current flow is along the plane of the biomolecule receiving material. FIGS. 2A, 2B, 2C and 2D, show one set of arrows along the plane of the biomolecule receiving material (membrane), which depicts the second direction of current flow. The first direction of current flow, in the embodiments depicted in FIGS. 2A, 2B, 2C and 2D, is perpendicular to the plane of the biomolecule receiving material and is depicted by the arrows that begin at the cathode. Accordingly, the arrangement of electrodes (and other components) depicted in FIGS. 2A, 2B, 2C and 2D, the vertical arrows from the cathode toward the biomolecule receiving material depict a first direction of current flow which is perpendicular to the plane of the biomolecule receiving material (from cathode to anode in the drawings) and the arrows in the biomolecule receiving material depict the second direction of current flow. As noted above, in some embodiments, devices for electrotransfer of the disclosure comprise one or more of these exemplary arrangement of components, to facilitate the noted directions of current flow, in one or more receptacles.

Figure 3A:
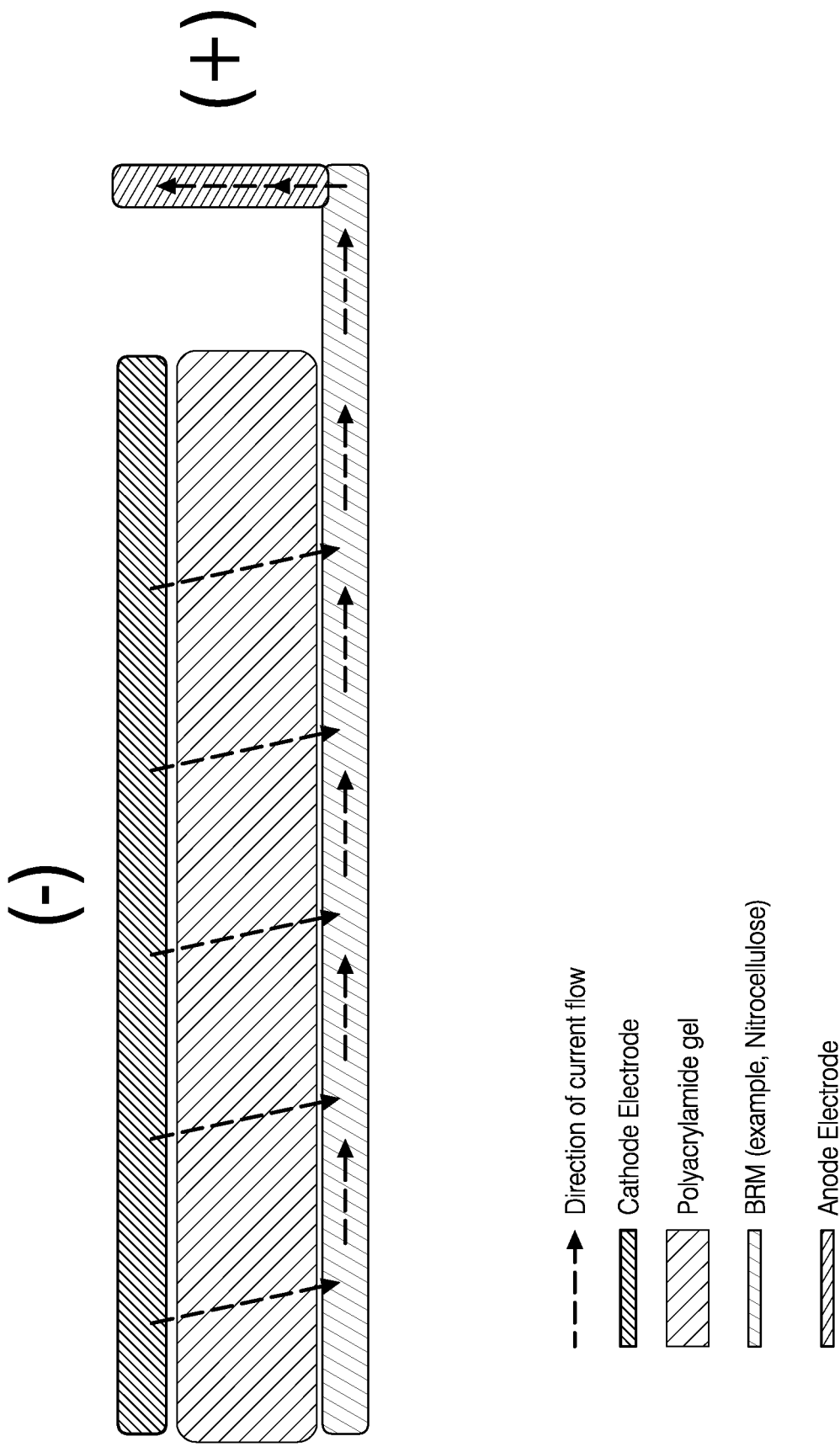
FIGS. 3A-3C is a schematic representation of three exemplary arrangement of components in devices/systems of the disclosure, that can be used to perform electrophoresis and/or electrotransfer and/or detection, wherein FIG. 3A. shows the placement of various components and direction of flow of electric current according to one embodiment, wherein FIG. 3B. shows the placement of various components and direction of flow of electric current according to another embodiment, and wherein FIG. 3C. shows the placement of various components and direction of flow of electric current according to yet another embodiment.
Figure 3B:
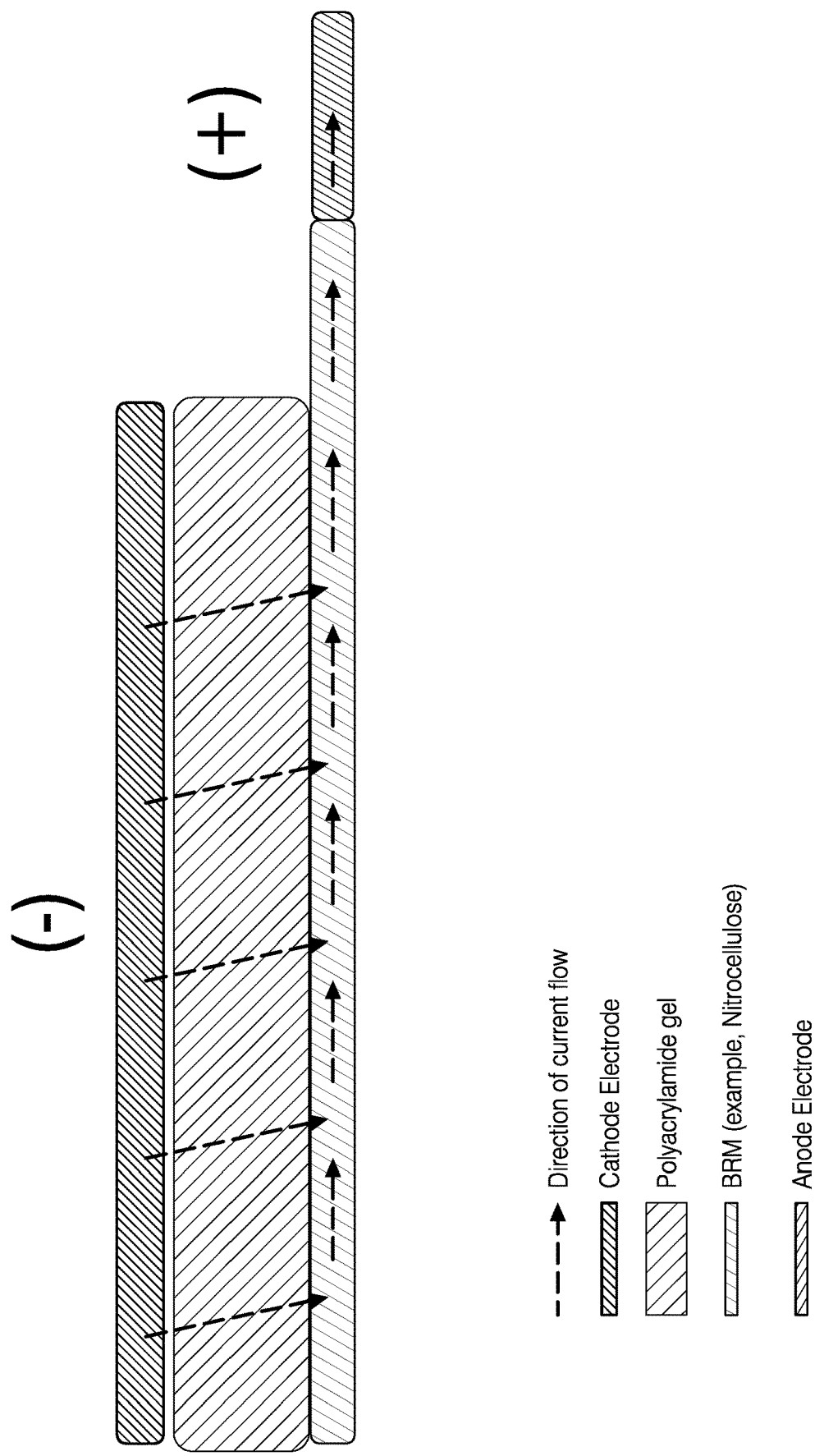
Figure 3C:
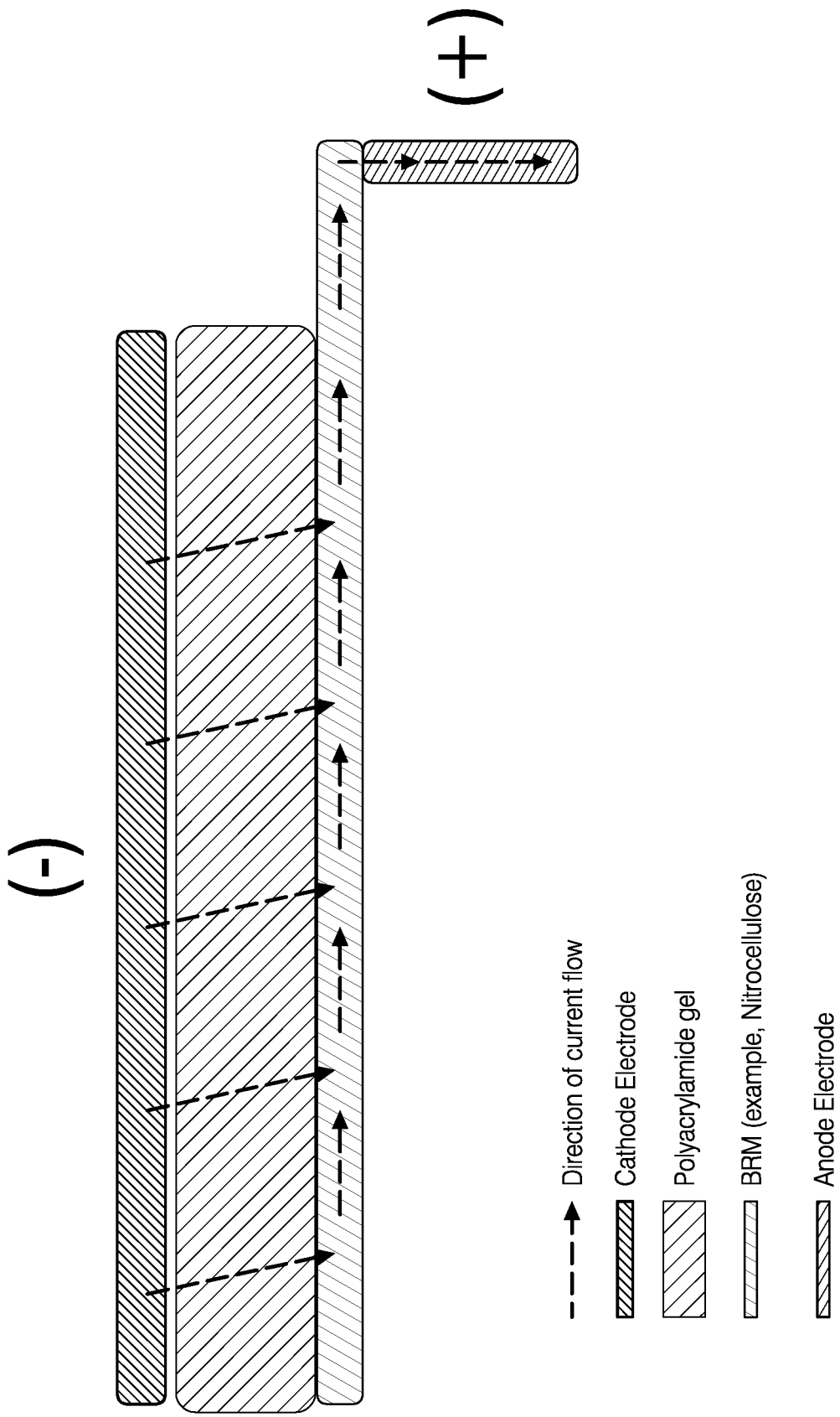

In one embodiment, in an electrotransfer device of the disclosure, the first direction of current flow is transverse to the plane of the biomolecule receiving material. In one embodiment, in a device for electrotransfer, the first direction of current flow is diagonal to the plane of the biomolecule receiving material. In these embodiments, the second direction of current flow is along the plane of the biomolecule receiving material. Several exemplary arrangements of components for assembling electrotransfer devices of the disclosure with these directions of current flow are depicted in FIGS. 3A, 3B and 3C. These exemplary assemblies show a first direction of current flow by the traverse/diagonal arrows that run from the cathode through the matrix toward the biomolecule receiving material, and the arrow along the plane of the biomolecule receiving material depicts the second direction of current flow which is along the plane of the biomolecule receiving material.

While not expressly depicted in FIGS. 2A-3C, electrical contact between electrodes and other components of a device/system described here can be achieved by any number of means. Some non-limiting examples of achieving electrical contact can include, direct contact with a matrix or a biomolecule receiving material (as depicted); or contact via a conductive material such as an ion reservoir, a buffer wick, a buffer, a matrix with ions, a conductive material embedded in (or in contact with) either the matrix or the biomolecule receiving material component, an electrical interface and the like. In some embodiments, a device of the disclosure further comprises an ion reservoir. Non-limiting examples of an ion reservoir include: a buffer wick, a buffer, a filter paper with ions, a solid matrix comprising ions or a liquid matrix comprising ions.

A biomolecule receiving material can be comprised of any porous material that can receive a biomolecule and can comprise one or more of the following non-limiting examples including: a membrane, a nitrocellulose, a PVDF (polyvinylidene difluoride), a cellulose acetate, an anodic aluminum oxide, a nylon, a glass fiber, a polyester. A biomolecule receiving material can be comprised of one or more conductive materials embedded in any of the foregoing materials. Some non-limiting examples of a conductive materials that can be embedded in a biomolecule receiving material include, tantalum, copper, indium tin oxide and the like.

As noted in sections above receptacles include but are not limited to channels, capillaries, microfluidic channels, surfaces, glass slides, plastic slides, chambers, vessels, or containers and also include one or more channels, microfluidic channels, surfaces, glass slides, plastic slides placed inside a receptacle, vessel, chamber or container. In some embodiments, a device for electrotransfer comprises a plurality of receptacles. In some embodiments, the receptacle is made of a transparent material. In some embodiments a device for electrotransfer according to the present disclosure is a microfluidic device.

In some embodiments, a biomolecule receiving material is placed on the receptacle. A biomolecule receiving material can be comprised of any porous material that can receive a biomolecule and can comprise one or more of the following non-limiting examples including: a membrane, a nitrocellulose, a PVDF (polyvinylidene difluoride), a cellulose acetate, an anodic aluminum oxide, a nylon, a glass fiber, a polyester. A biomolecule receiving material can be comprised of one or more conductive materials embedded in any of the foregoing materials. Some non-limiting examples of a conductive materials that can be embedded in a biomolecule receiving material include, tantalum, copper and/or indium tin oxide.

In some embodiments, a biomolecule receiving material has a pore size of from about 0.2 µM-10 µM including all numbers and ranges in between. In some embodiments, pore size of a biomolecule receiving material can be different in different areas of the biomolecule receiving material. In some embodiments, a biomolecule receiving has at least two layers. In some embodiments, each layer of the biomolecule receiving material has a different pore size.

In some embodiments, the arrangement of components depicted in FIGS. 2A, 2B and 2C and in FIGS. 3A, 3B and 3C can be placed in receptacles to form devices/systems that are further configured to perform electrophoresis of biomolecules. In such embodiments of a device of the disclosure, the receptacle further comprises a matrix in which the biomolecules can be electrophoretically separated. In some embodiments, a matrix is positioned parallel to the biomolecule receiving material, or above at least a portion of the biomolecule receiving material. Non-limiting examples of a matrix comprise a polymeric material, a gel, an agarose gel, an acrylamide gel, a polyacrylamide gel, a dextran, or a polyethylene glycol. Some of these embodiments will be depicted below.

In some embodiments, matrices are thin matrices or thin gels comprising for example a SDS-PAGE gel. In some embodiments, thin gels have a thickness of from about 20 µm to about 200 µm, including numbers in between such as 20 µm, 30 µm, 40 µm, 50 µm, 60 µm, 70 µm, 80 µm, 90 µm, 100 µm, 120 µm, 130 µm, 140 µm, 150 µm, 160 µm, 170 µm, 180 µm, 190 µm, and 200 µm, and in some embodiments about 100 µm. In some embodiments, the thickness of a biomolecule receiving material in a device of the disclosure can be about half the thickness of the thin matrix layer.

Exemplary matrices can be prepared and cast as described in the examples here. Three basic types of buffers are commonly used in SDS-PAGE electrophoresis. A gel casting buffer, a sample buffer, and a running buffer that is used to fill an electrode reservoir. A discontinuous gel system is typically used for effective separation of protein biomolecules. Discontinuous buffer systems utilize a different gel buffer and running buffer. These systems also use two gel layers of different pore sizes and different buffer compositions (the stacking and separating gels). Electrophoresis using a discontinuous buffer system results in concentration of the sample and higher resolution. The various commonly used discontinuous gel buffer systems include A) the classic Laemmli system using the Tris-Glycine buffer system. The pH and ionic strength of the buffer used for running the gel (Tris, pH 8.3) are different from those of the buffers used in the stacking gel (Tris, pH 6.8) and the resolving gel (Tris, pH 8.8). B) The Bis-Tris system: In Bis-Tris gels, chloride serves as the leading ion and MES or MOPS act as the trailing ion. Bis-Tris buffer forms the common cation. Markedly different protein migration patterns are produced depending on whether a Bis-Tris gel is run with MES or MOPS denaturing running buffer: MES buffer is used for smaller proteins, and MOPS buffer is used for mid-sized proteins. C) Tris-Acetate. Tris-acetate gel chemistry enables the optimal separation of high molecular weight proteins. Tris-acetate gels use a discontinuous buffer system involving three ions-acetate, tricine and tris. Compared with Tris-glycine gels, Tris-acetate gels have a lower pH, which enhances the stability of these gels and minimizes protein modifications, resulting in sharper bands.

In some embodiments, the arrangement of components depicted in FIGS. 2A, 2B and 2C and in FIGS. 3A, 3B and 3C can be placed in receptacles to form devices/systems that are further configured to perform electrophoresis as well as detection of biomolecules. In such embodiments, the receptacle further comprises a matrix in which the biomolecules can be electrophoretically separate and the device further comprises the at least one or more chambers/channels/reagent holders containing detection solutions such as but not limited to one or more of the following: one or more antibodies, one or more antigens, chemiluminescent reagents, fluorescent reagents, colorimetric reagents, solutions containing other biomolecule detection reagents, one or more buffers/wash solutions and any combinations thereof. Some of these embodiments will be depicted below.

Devices and systems of the disclosure can have several different configurations and numbers for electrodes. In some embodiments of a device of the disclosure, the first electrode is positioned above at least a portion of a biomolecule receiving material. The first electrode, in some embodiments, is further positioned before and/or ahead of an area where biomolecules are received onto the biomolecule receiving material. The second electrode, in some embodiments, is positioned distal-to/after/posterior-to the biomolecule receiving area in the biomolecule receiving material and can be further positioned above the biomolecule receiving material. In some embodiments, at least one of the two electrodes can be physically moved within the receptacle. In some embodiments an electrode can be moved past the distal end of the matrix. In some embodiments of a device of the disclosure, at least one electrode is located past the distal end of the matrix and separated by an insulated area. In some embodiments of a device of the disclosure, at least one of the electrodes is located above at least a portion of the matrix.

In some embodiments, the electrodes are positioned such that they do not obscure view of the area where biomolecules are received onto the membrane. Devices of the disclosure can have electrical connections to independently control each electrode. In some embodiments of a device of the disclosure, at least one ion reservoir is placed above at least a portion of the matrix. A device of the disclosure in some embodiments comprises a second ion reservoir. The second ion reservoir is located at the distal end of the matrix or is located after the distal end of the matrix. The first or the second ion reservoirs of a device of the disclosure can be physically moved. As noted in sections above electrodes may contact other components directly or via an ion reservoir. Some examples of these embodiments are shown in FIG. 4A and FIG. 4B and FIG. 5.

FIG. 4A and FIG. 4B are side views of two exemplary electrotransfer device of the disclosure shown arranged in/on a receptacle (shown here in a non-limiting example as a surface or a slide). FIG. 4A and FIG. 4B depict one electrode, such as for example, a copper wire cathode electrode (−) (depicted as an orange circle and as an cathode by the negative sign) and as a longer cathode, such as for example, a copper plate cathode electrode (−) (in FIG. 4B), placed on top of a buffer wick (depicted in grey) to make electric contact with a gel matrix (depicted in blue) and an anode also placed on top of a buffer wick to make electrical contact with a biomolecule receiving material (shown in this example as a nitrocellulose membrane). The red arrows depict the direction of current flow from the electrodes through various components. The image of the nitrocellulose membrane on the right side of FIGS. 4A and 4B demonstrates Near IR (NIR) protein markers separated on a solid polyacrylamide gel (PAG) were transferred directly to a nitrocellulose surface placed on a glass slide as a receptacle. In both the devices proteins (biomolecules) were successfully transferred to a nitrocellulose membrane coated on a glass plate receptacle.

As noted above arrangement of components depicted in FIGS. 2A, 2B and 2C and in FIGS. 3A, 3B and 3C can be placed in receptacles to form devices/systems that are further configured to perform electrophoresis of biomolecules and further configured to perform detection. In such embodiments of a device of the disclosure, the receptacle further comprises a matrix in which the biomolecules can be electrophoretically separated. In some embodiments, a matrix is positioned parallel to the biomolecule receiving material, or above at least a portion of the biomolecule receiving material. Non-limiting examples of a matrix comprise a polymeric material, a gel, an agarose gel, an acrylamide gel, a polyacrylamide gel, a dextran, or a polyethylene glycol. FIG. 5 is a side view of another exemplary electrophoresis and electrotransfer system of the disclosure, according to one embodiment. In this embodiment, 3 ul of pre-stained Near IR (NIR) marker proteins were loaded into a sample wells in a PAG as shown in FIG. 5, panel a. buffer wicks represented here by two paper wicks, each 2 sq·cm, presoaked with 1× electrophoresis buffer were placed at the two ends of the PAG gel overlapping just enough to maintain electrical continuity. Two electrodes, − and +, as shown in FIG. 5 panels a. and b., are then placed on top of these wicks and electrophoresis was carried out at 100V for 15 minutes to electrophoretically separate proteins (as shown in FIG. 5 panels a and b). Following electrophoretic separation of the proteins another negative electrode and an equal sized wick soaked with 1× electrophoresis buffer is placed on top of the PAG covering it completely. The positive electrode and its ion reservoir (buffer soaked 2 sq·cm wick) was then moved or placed away (about a centimeter or lesser away) from the PAG such that it still maintains electrical contact with the nitrocellulose membrane. 0.2 ml of a 1× electrophoresis buffer was added to the exposed nitrocellulose between the electrodes to keep it wet and to conduct electricity (FIG. 5, panel c). 150V of electric current is applied for 15 mins. With the changes in placement of electrodes the electric current now flows via the PAG and nitrocellulose toward the positive electrode and in the process transfers the proteins from the PAG to the nitrocellulose surface. Proteins then become immobilized in the nitrocellulose membrane as shown in FIG. 5, panel d. After the electrotransfer the PAG and associated wicks were gently removed such that the exposed nitrocellulose surface with the transferred biomolecules on is ready for the next step in western blot processing. As depicted in FIG. 5, panel e, the exposed nitrocellulose surface can be washed or exposed with detecting reagents and the western blot can be processed for analysis.

In some embodiments, a device comprises: one or more of the receptacles, each receptacle comprising: a biomolecule receiving material; a first electrode; a second electrode, wherein the second electrode is in electrical contact with the biomolecule receiving material and is located outside an area where one or more biomolecules are received onto the biomolecule receiving material; and at least a first ion reservoir; a means to move or to position the first electrode and the first ion reservoir above at least a portion of the matrix where the biomolecules are present; and a means to activate and inactivate the first electrode and the second electrode.

In some embodiments, a device comprises: at least one receptacle comprising: a matrix operable to separate one or more biomolecules contained in a sample along the length of the matrix, the matrix having a sample loading area at its anterior end; a biomolecule receiving material, placed in a parallel plane below the matrix; at least a first electrode and a second electrode; the first electrode located above at least a portion of the matrix and positioned anterior to the sample loading area; a second electrode, wherein the second electrode is in electrical contact with the biomolecule receiving material and is located outside an area where biomolecules are received onto the biomolecule receiving material; and at least one ion reservoir, wherein the first and the second electrode can be activated and inactivated, and wherein the first electrode and a first ion reservoir can be moved or positioned onto at least a portion of the top of the matrix, and wherein the second electrode and a second ion reservoir c can be moved or positioned past the distal end of the matrix such that the second electrode and the second ion reservoir are electrically connected to the biomolecule receiving material.

In some embodiments a device of the disclosure further comprises a third electrode. In some embodiments a device of the disclosure further comprises a fourth electrode. These embodiments are shown and described in FIGS. 6A-12D and in FIGS. 14A-C.

A device for electrophoresis and electrotransfer in some embodiments can comprise a liquid matrix and can be configures as a microfluidic device as described in examples below. Several embodiments of such devices. In one embodiment, a device for electrophoresis and electrotransfer of biomolecules comprises: at least one receptacle the receptacle comprising: a biomolecule receiving material; a matrix, a first electrode; and a second electrode, wherein the second electrode is in electrical contact with the biomolecule receiving material, and is located after and/or distal to and/or posterior to an area where biomolecules are received. In some embodiments of a device of the disclosure, the first electrode is positioned above at least a portion of a biomolecule receiving material. The first electrode, in some embodiments, is further positioned before and/or ahead of an area where biomolecules are received onto the biomolecule receiving material. The matrix is a liquid separation matrix which in non-limiting examples, can comprise a liquid polymeric material, a liquid polyacrylamide, a solution of polyacrylamide, a polyethylene glycol, a mixture of one or more polyethylene glycols, or a dextran, or a quantity of agarose. In some embodiments, a liquid separation matrix further comprises at least one source of ions. Non-limiting examples of ion source comprises one or more ions selected from glycine, chloride, sodium, sulfate, acetate, Tris and the like. Some of these embodiments are shown and described in FIGS. 6A-12D and in FIGS. 14A-C.

In some embodiment, a device comprises: at least one receptacle comprising: a matrix operable to separate biomolecules along its length, the matrix having the sample loading area at its anterior end; a biomolecule receiving material, placed in a parallel plane below the matrix; at least a first electrode, a second electrode and a third electrode; the first electrode located above at least a portion of the matrix and positioned anterior to the sample loading area; the second electrode located above at least a portion of the matrix and positioned near the posterior end of the matrix; the third electrode in electrical contact with the biomolecule receiving material and positioned after the posterior end of the matrix; and at least one ion reservoir. In some embodiments, the first and the second and the third electrode can be activated and inactivated.

In some embodiments, a device of the disclosure further comprises at least one port. A port can additionally comprise at least one seal or sealing mechanism such as but not limited to a resealable plastic seal, a rubber bottle stopper or auto-resealable seals. In some embodiments, a device of the disclosure comprises at least one port that is pierceable and auto-resealable. In some embodiments, a device of the disclosure has at least one port that is operable to receive a sample. In some embodiments, the at least one or more ports of a device of the disclosure can be used for one or more of the following including but not limited to: to receive or contain an electrode, add or remove the matrix, add or move an electrode, add a sample to the matrix, add or remove one or more components selected from solutions containing one or more antibodies, solutions containing one or more biomolecule detection reagents, reagents to bind and/or detect biomolecules transferred to the biomolecule receiving material, add or remove one or more buffers and any combinations thereof. Some of these embodiments are shown and described in FIGS. 6A-12D and in FIGS. 14A-C.

In some embodiments, a device of the disclosure one port comprises at least one removable plug. Ports in devices of the disclosure can comprise at least one support structure to prevent one or more of the ports from collapsing. A support structure can comprise or be made of a porous structure supporting one or more ports from collapsing. In some embodiments, a support structure that is comprised or made of a porous supporting structure can comprise a gel matrix such as but not limited to agarose. In some embodiments, the separation and transfer of biomolecules in the matrix and the biomolecule receiving material is in a horizontal direction. In some embodiments, the separation and transfer of biomolecules in the matrix and the biomolecule receiving material is in a vertical direction. These embodiments are shown and described in FIGS. 6A-12D and in FIGS. 14A-C.

In some embodiments, in a device of the disclosure, at least one electrode is located in a port. In some embodiments, a first electrode is located in the sample loading port. In some embodiments, a second electrode is located in a port located at the distal end of the matrix. In some embodiments, a third electrode is located past the distal end of the matrix and is in physical contact with the membrane. In some embodiments, a third electrode is positioned after/posterior to an insulator that is adjacent to the posterior end of the matrix. In some embodiments, a third electrode is positioned posterior to the insulator that is encapsulating the matrix. In some embodiments an insulator is air or a non-conductible material. In some embodiments, the insulator is a non-conductible material such as polycarbonate, nylon, or HTPE. In some embodiments, a fourth electrode located above the matrix. In some embodiments, the fourth electrode is further located along the edge of a receptacle such that it does not obstruct the view of the biomolecule receiving material. In some embodiments, the fourth electrode located along the edge of a receptacle. The fourth electrode can, in some embodiments, be separated from the liquid matrix separation media by a thin layer of a porous, higher resistance or lower conductance containing material. In nonlimiting examples the thin layer can have a thickness of 0.1 mm-0.5 mm. Porous materials may include materials such as but not limited to agarose. These embodiments are shown and described in one or more of FIGS. 6A-12D and in FIGS. 14A-C.

In some embodiments, a device/system of the disclosure comprises three electrodes. In one embodiment, a three electrode device comprises: at least one receptacle (or a plurality of receptacles) comprising: a matrix operable to separate the biomolecules along its length, the matrix having the sample loading area at its anterior end; a biomolecule receiving material, placed in a parallel plane below the matrix; at least a first electrode, a second electrode and a third electrode; the first electrode located above at least a portion of the matrix and positioned anterior to the sample loading area; the second electrode located above at least a portion of the matrix and positioned near the posterior end of the matrix; the third electrode in electrical contact with the biomolecule receiving material and positioned after the posterior end of the matrix; and at least one ion reservoir. In some embodiments, electrophoresis of a sample in a matrix of this device can be performed by activating the first and second electrodes and inactivating the first and second electrodes to stop electrophoresis after the biomolecules are resolved. In some embodiments, electrotransfer of the biomolecule in this device can be performing to transfer biomolecules from the matrix onto the biomolecule receiving material by reactivating the first electrode and activating the third electrode wherein the third electrode is in electrical contact with the biomolecule receiving material; and then inactivating the first and third electrodes to stop the electrotransfer once complete.

Figure 6A:
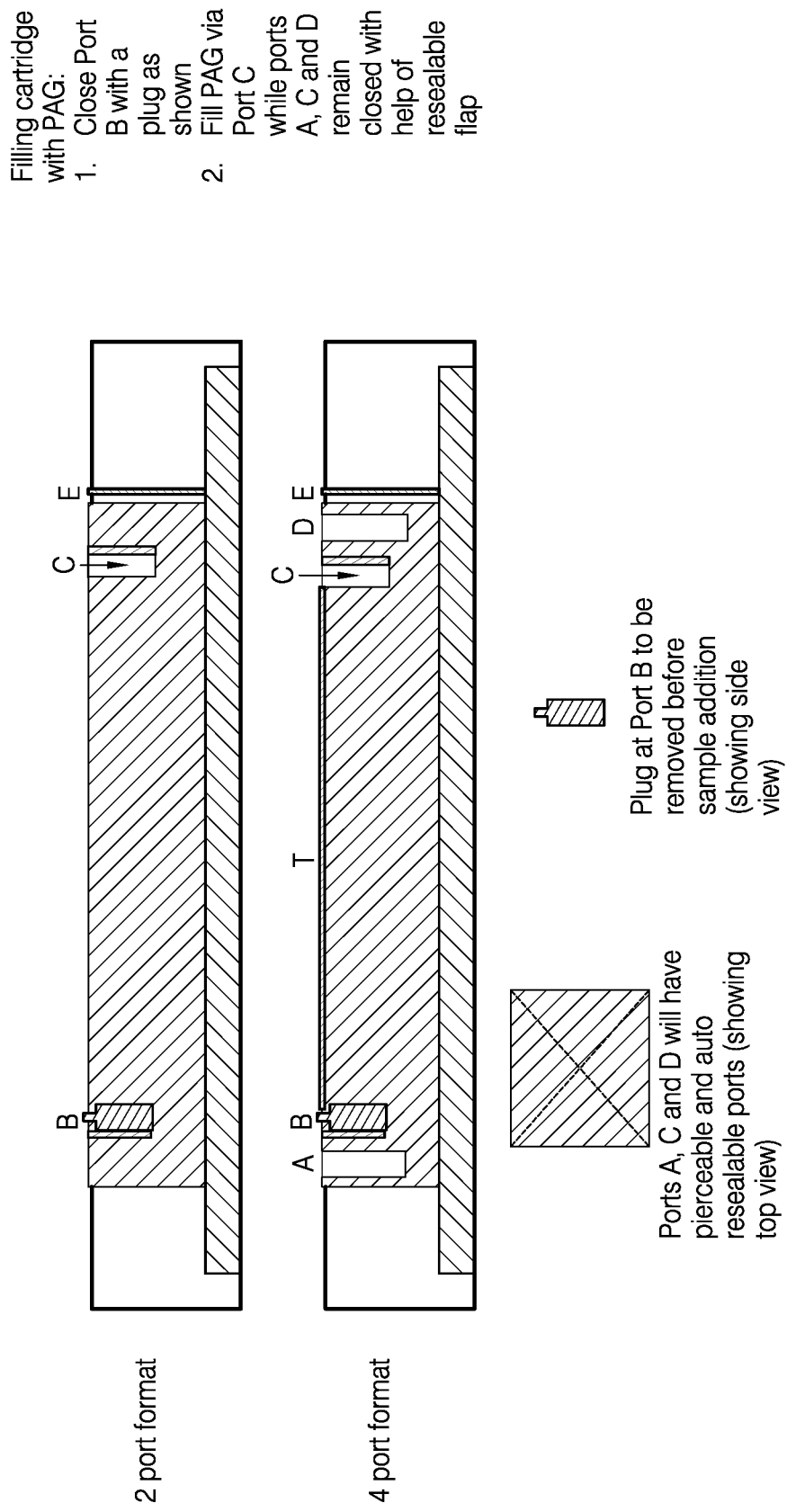
FIG. 6A is a side view of two exemplary electrophoresis and/or electrotransfer system of the disclosure, according to one embodiment.

FIG. 6A depicts one embodiment of such a device in the illustration in the top panel that comprises three electrodes and two ports in a receptacle. As shown herein, three electrodes are depicted as first electrode B, second electrode C and third electrode E. Electrode B is located in the first port (also depicted as B, port B). Port B is also a sample port. Port B has a plug that can be removed by a user before adding sample into port B. Second port C has electrode C and electrode E is placed posterior or after the biomolecule receiving area on the biomolecule receiving material (shown at the bottom of the receptacle in blue) and the grey area depicts a liquid/solid matrix for electrophoresis. In this 2-port device, if a liquid matrix is used, port C can be used to fill the liquid matric when port B remains sealed with a plug. Once sample is added into unplugged port B, electrodes B and C are activated to electrophorese the biomolecules in the sample in the matrix. Once the biomolecules are resolved, electrodes B and C are switched off and electrodes B and E are switched on to initiate electrotransfer of electrophoretically separated biomolecules from matrix to the biomolecule receiving material at the bottom of the receptacle. The electrical current now drives the separated biomolecules into the biomolecule receiving material and electrodes B and E can be switched off once transfer is completed.

In some embodiments, a device/system of the disclosure comprises four electrodes. In one embodiment, such a device/system has at least one (or a plurality of) receptacle (s) comprising: a matrix operable to separate the biomolecules along its length, the matrix having the sample loading area at its anterior end; a biomolecule receiving material, placed in a parallel plane below the matrix; at least a first electrode, a second electrode, a third electrode and a fourth electrode; the first electrode located above at least a portion of the matrix and positioned anterior to the sample loading area; the second electrode positioned toward the posterior end of the matrix; the third electrode in electrical contact with the biomolecule receiving material and positioned after the posterior end of the matrix; the fourth electrode located above the matrix; and at least one ion reservoir. To perform electrophoresis of biomolecules in a samples in the matrix the first electrode and the second electrode is activated. These first and second electrodes are inactivated the to stop the electrophoresis when complete. To perform electrotransfer of the biomolecule from the matrix into the biomolecule receiving material the third electrode and the fourth electrode are activating and after the electro transfer is completed the third and fourth electrodes are inactivated.

FIG. 6A depicts one embodiment of a device in the illustration in the bottom panel of FIG. 6A having four electrodes and four ports in a receptacle. As shown herein four electrodes are depicted as first electrode B, second electrode C, third electrode E and fourth electrode T. First port A can be used to add reagents for detection such as but not limited to western blot reagents such as antibodies, wash solutions, and other buffers. Electrode B is located in the second port (also depicted as B, port B). Port B is also a sample port. Port B has a plug that can be removed by a user before adding sample into port B. Third port C has electrode C and electrode E is placed posterior to or after the biomolecule receiving area on the biomolecule receiving material (shown at the bottom of the receptacle in blue) and the grey area depicts a liquid/solid matrix for electrophoresis. In this 4-port device, if a liquid matrix is used, port C can be used to fill the liquid matric when ports A, B and D remains sealed with a plug or an auto-sealable and/or pierceable port mechanism. Once sample is added into unplugged port B, electrodes B and C are activated for electrophoresis of the biomolecules in the matrix. Once the biomolecules are resolved, electrodes B and C are switched off and electrodes T and E are switched on to initiate electrotransfer of electrophoretically separated biomolecules from matrix to the biomolecule receiving material at the bottom of the receptacle. The electrical current now drives the separated biomolecules into the biomolecule receiving material and electrodes T and E can be switched off once transfer is completed.

Figure 6B:
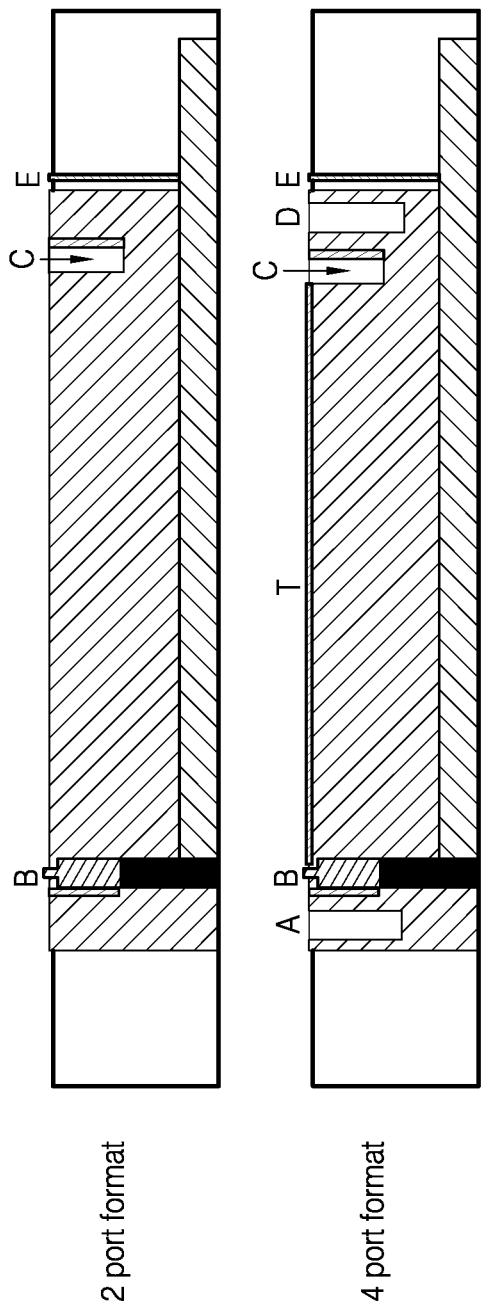
FIG. 6B is a side view of two exemplary electrophoresis and/or electrotransfer system of the disclosure, according to one embodiment.

Ports in devices of the disclosure can comprise at least one support structure to prevent one or more of the ports from collapsing. A support structure can comprise or be made of a porous structure supporting one or more ports from collapsing. In some embodiments, a support structure that is comprised or made of a porous supporting structure can comprise a gel matrix such as but not limited to agarose. FIG. 6B, top panel depicts a 2-port, three electrode device wherein the black area below port B is a support structure that prevents port B from collapsing after sample is added into a liquid matrix. FIGS. 6B, bottom panel, depicts a 4-port, four electrode device wherein the black area below port B is a support structure that prevents port B from collapsing after sample is added into a liquid matrix.

Figure 7A:
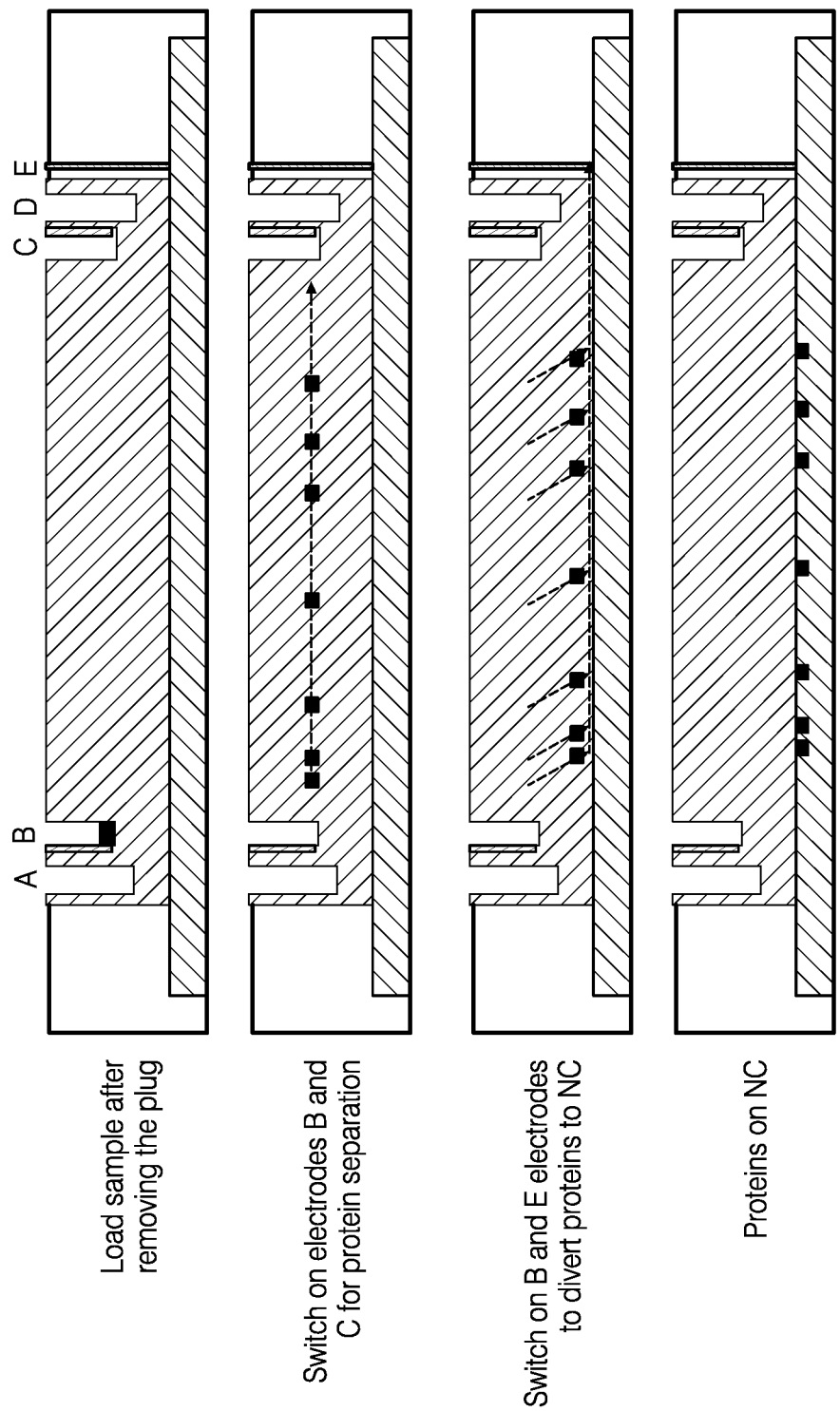
FIG. 7A is a side view of an exemplary system and method of the disclosure, showing electrophoresis and electrotransfer of biomolecules, according to one embodiment.
Figure 7B:
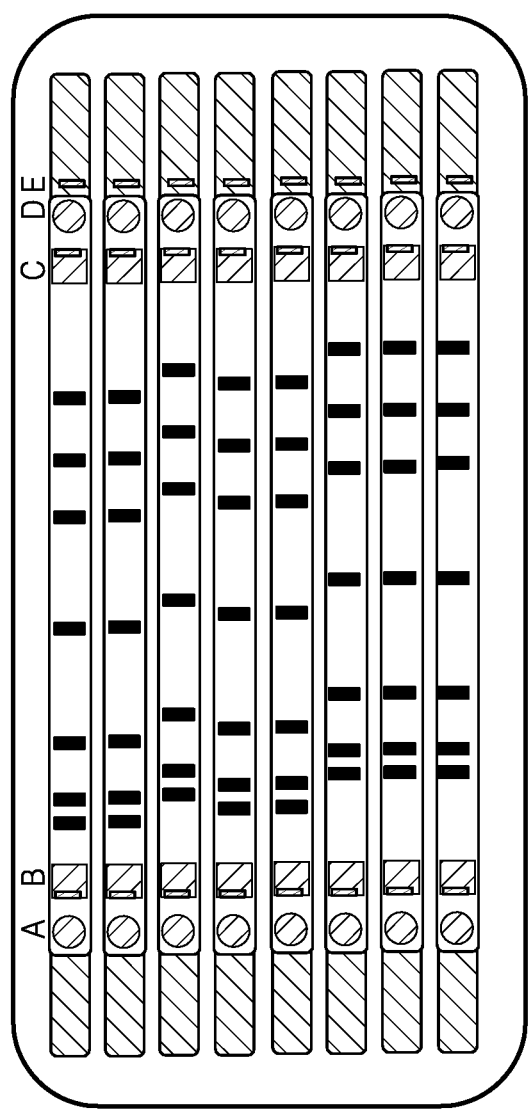
FIG. 7B is a top view of FIG. 7A, after electrophoresis and electrotransfer of biomolecules, according to one embodiment.
Figure 8A:
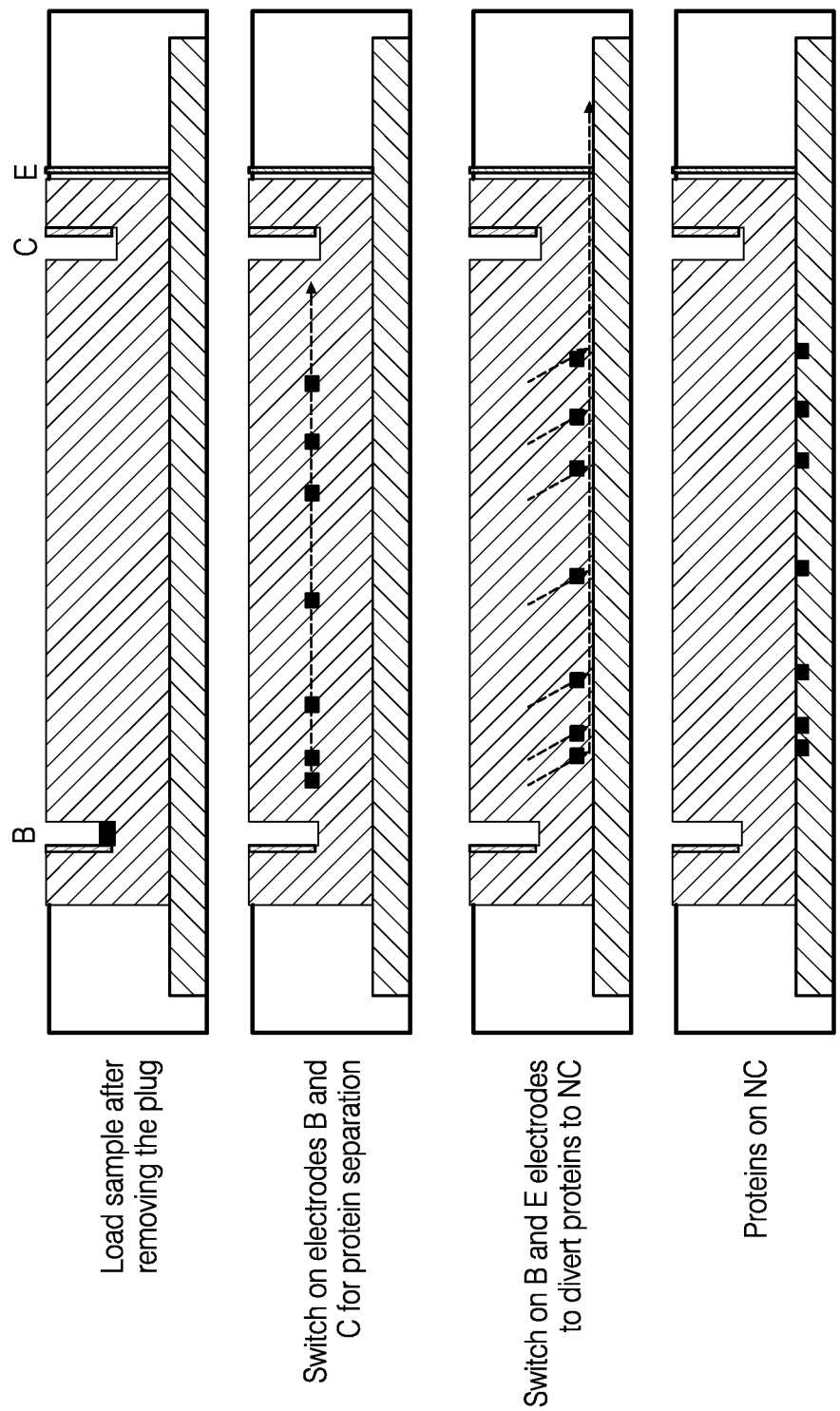
FIG. 8A is a side view of an exemplary system and method of the disclosure, showing electrophoresis and electrotransfer of biomolecules, according to one embodiment.
Figure 8B:
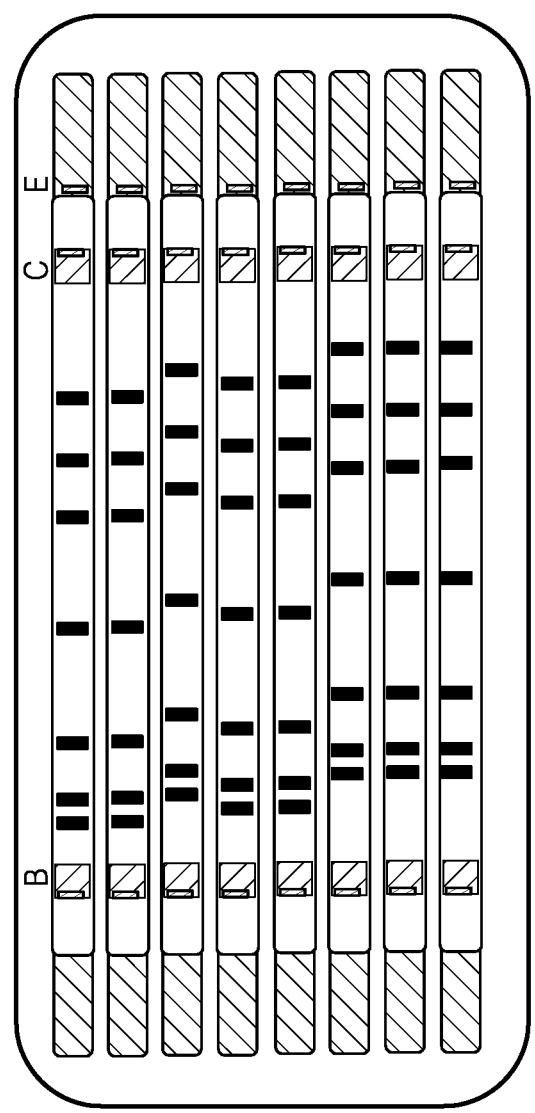
FIG. 8B is a top view of FIG. 8A, after electrophoresis and electrotransfer of biomolecules, according to one embodiment.
Figure 9A:
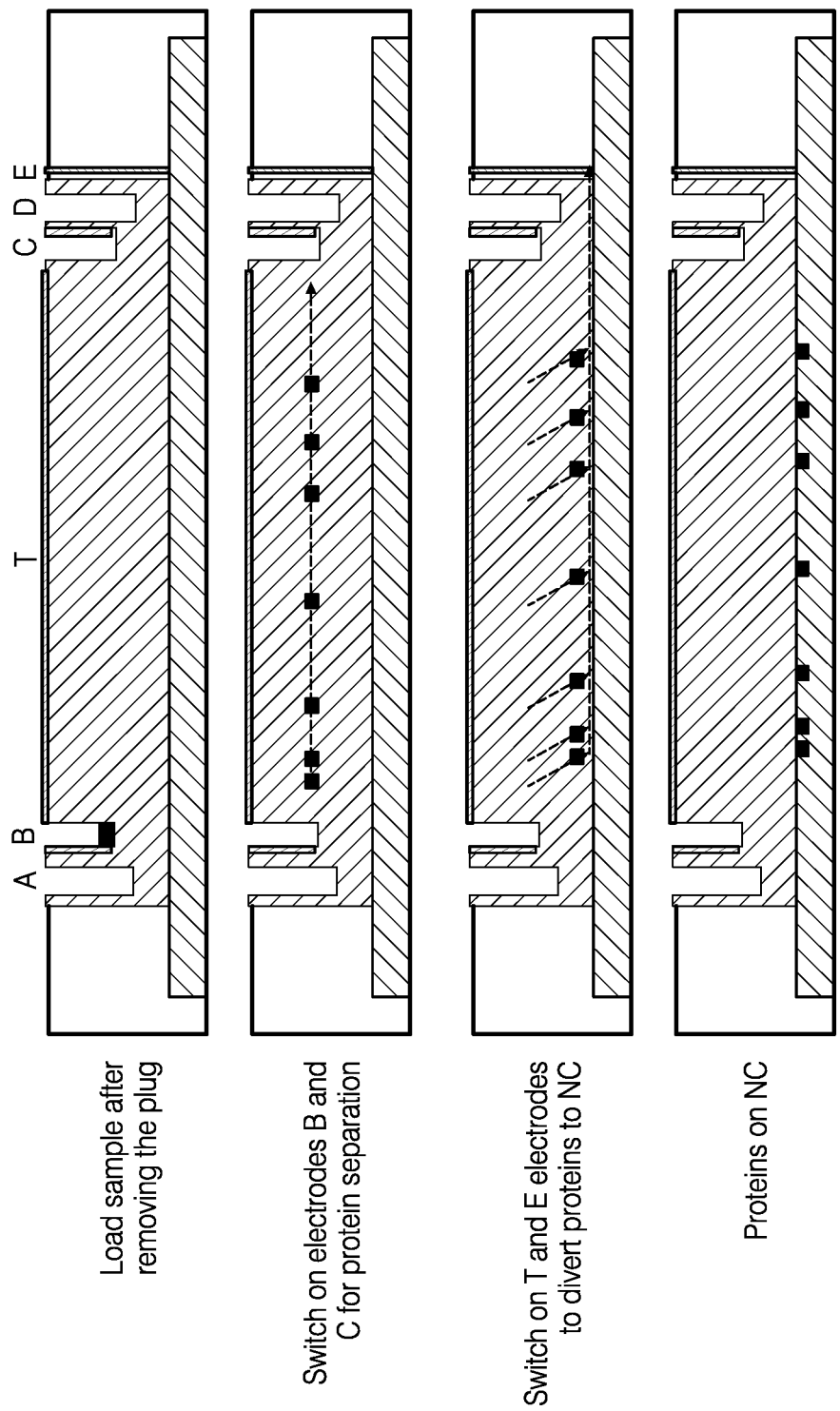
FIG. 9A is a side view of an exemplary system and method of the disclosure, showing electrophoresis and electrotransfer of biomolecules, according to one embodiment.
Figure 9B:
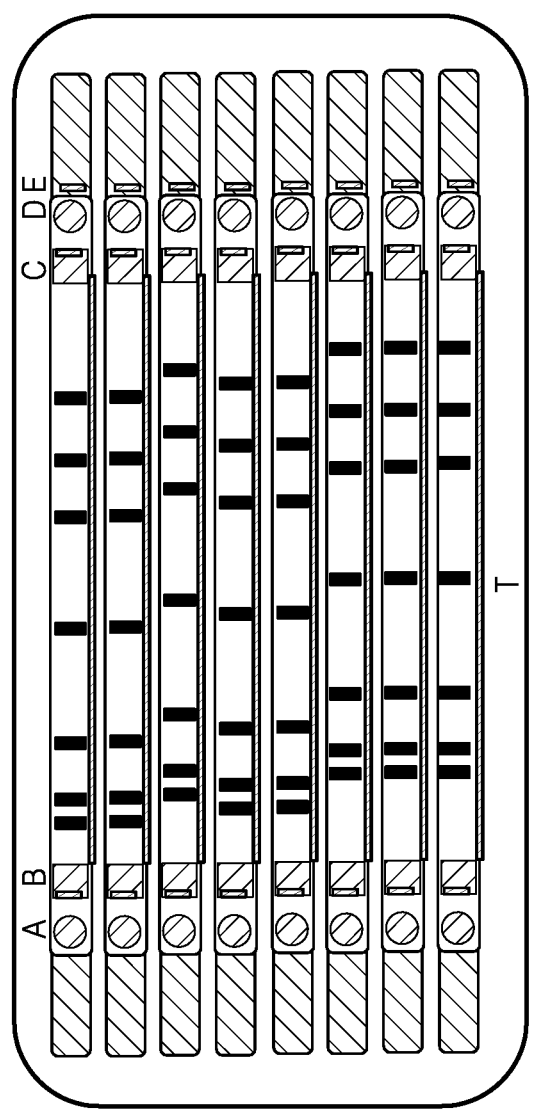
FIG. 9B is a top view of FIG. 9A, after electrophoresis and electrotransfer of biomolecules, according to one embodiment.
Figure 10A:
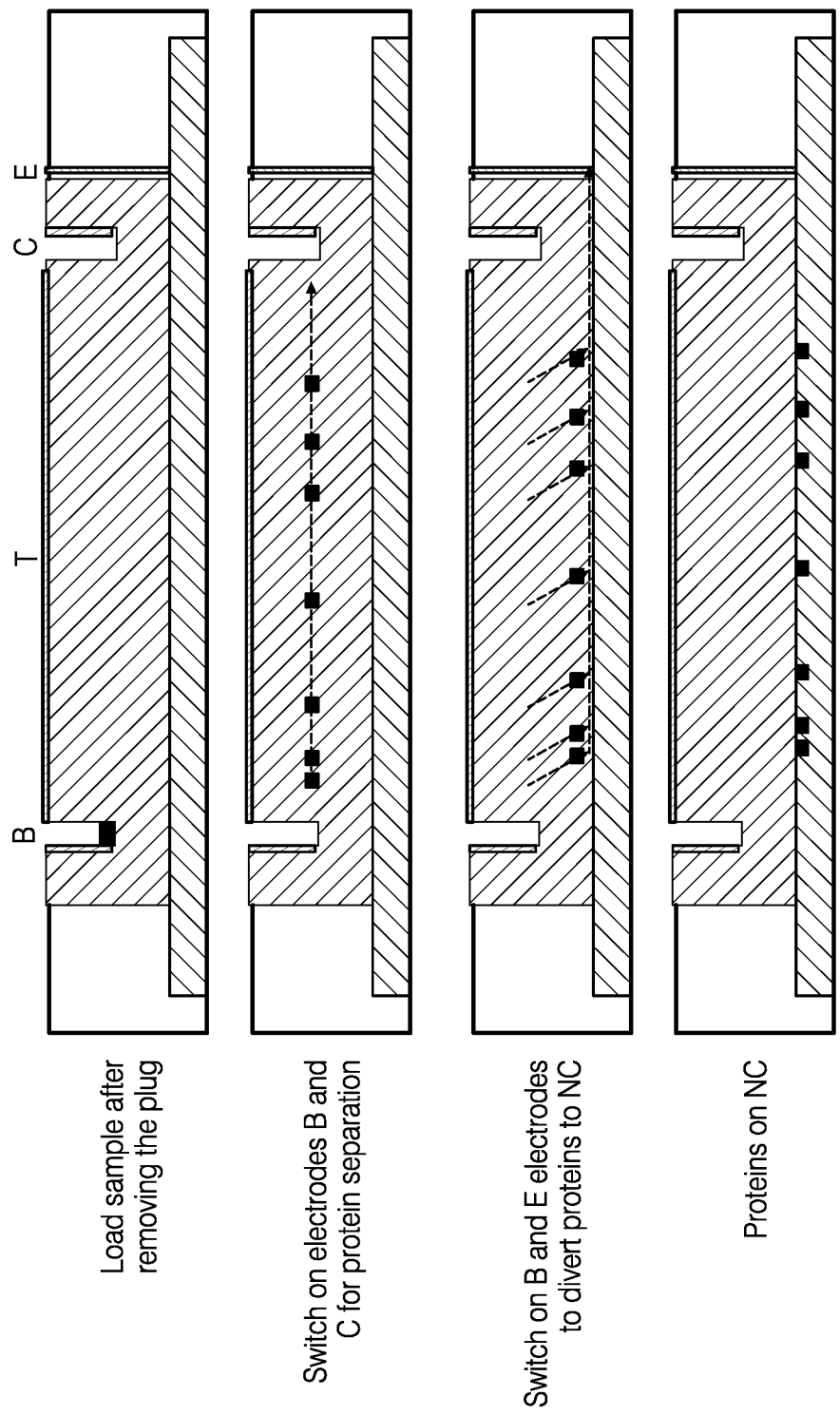
FIG. 10A is a side view of an exemplary system of the disclosure, showing electrophoresis and electrotransfer of biomolecules, according to one embodiment.
Figure 10B:
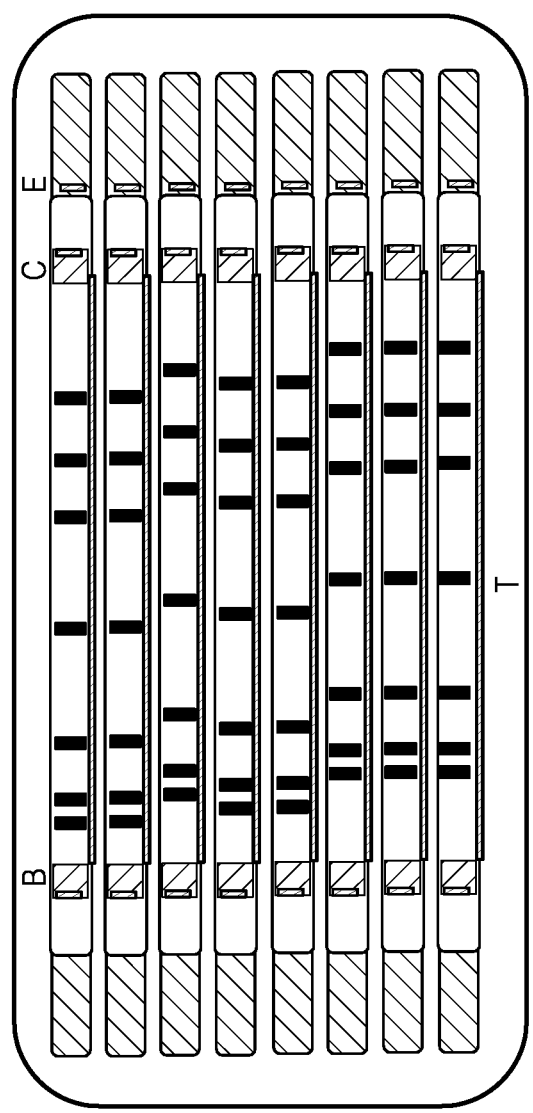
FIG. 10B is a top view of FIG. 10B, after electrophoresis and electrotransfer of biomolecules, according to one embodiment.

FIG. 7A and FIG. 9A depict side views of exemplary devices/systems having four ports and three electrodes for electrophoresis and electrotransfer of biomolecules and FIG. 7B and FIG. 9B depicts a top view of the same systems after electrophoresis and electrotransfer of biomolecules is completed. FIG. 8A and FIG. 10A depict side views of exemplary systems having three ports and three electrodes and shows method steps for electrophoresis and electrotransfer of biomolecules and FIG. 8B and FIG. 10B depicts a top view of the same systems after electrophoresis and electrotransfer of biomolecules is completed. The parts are similar to the four port and three port and four and three electrode embodiments described above. Method steps of these figures are described in detail in sections below.

In some embodiments, the separation and transfer of biomolecules in the matrix and the biomolecule receiving material is in a horizontal direction. This is shown in FIGS. 4A-10B and FIGS. 14A-C.

In some embodiments, the separation and transfer of biomolecules in the matrix and the biomolecule receiving material is in a vertical direction. This is shown in exemplary devices depicted in FIGS. 11A-12-D.

Figure 11A:
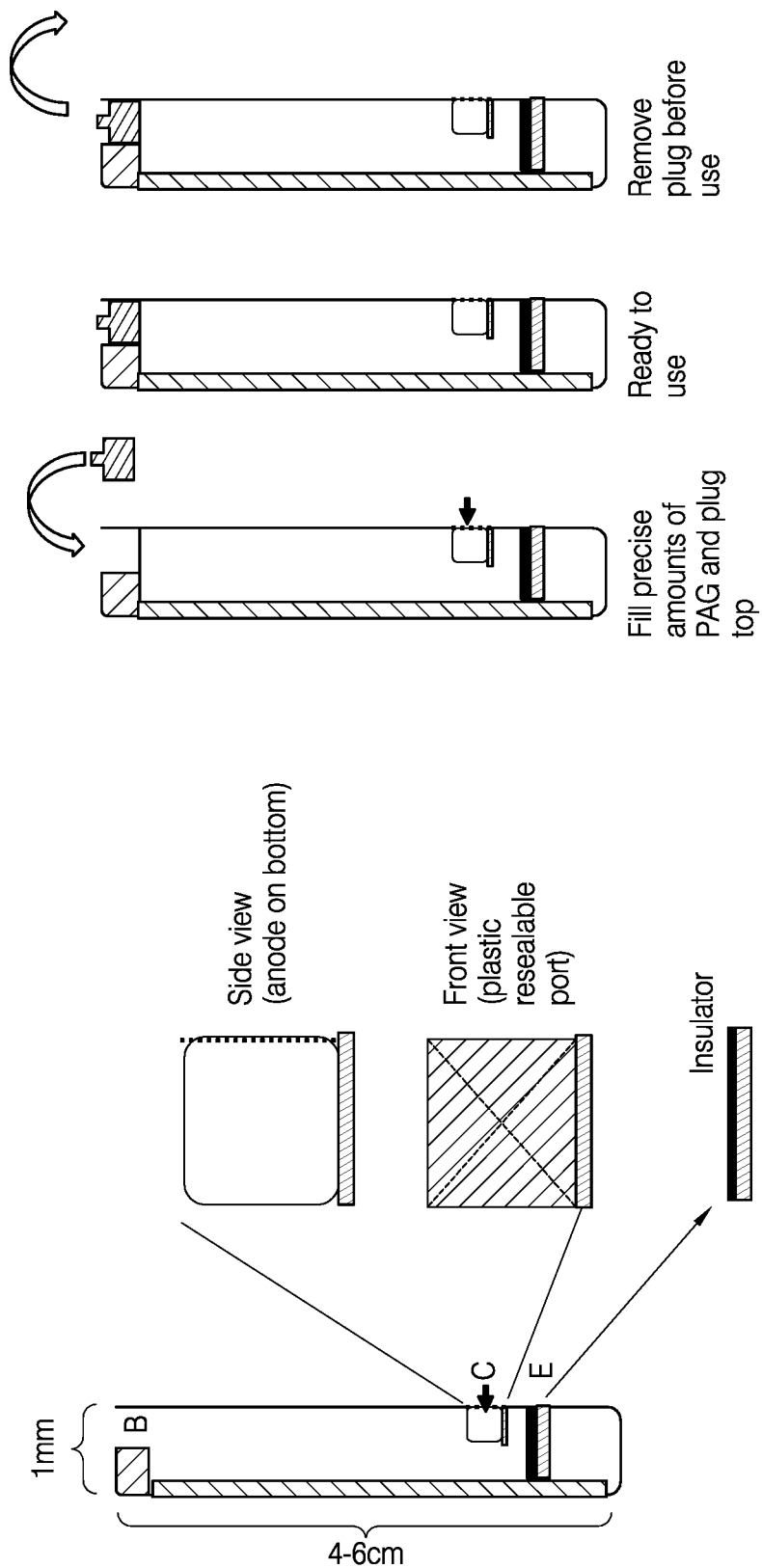
FIG. 11A is a side view of an exemplary device of the disclosure, showing an exemplary port operable to fill a liquid matrix into the device, according to one embodiment.

FIG. 11A depicts one embodiment of a vertical orientation of a device of the disclosure which has a receptacle enclosed on all sides having two ports, port B and port C, and a biomolecule receiving material (depicted in blue), placed on side of the receptacle. Port B is sealed with a removable plug (the seal forming one part of the enclosure of the receptacle), In this embodiment, as depicted in the right panel of FIG. 11A, port C is a pierceable and auto-sealable port that can be used to fill a liquid matrix into the receptacle. Once liquid matrix is filled up to the beginning of port B the plug (depicted in red) is used to seal port B located on the top. Receptacle of this device further comprises an electrode E (depicted in yellow) adjacent to an insulator (shown as a black line) and electrode C located in port C (depicted in yellow).

Figure 11B:
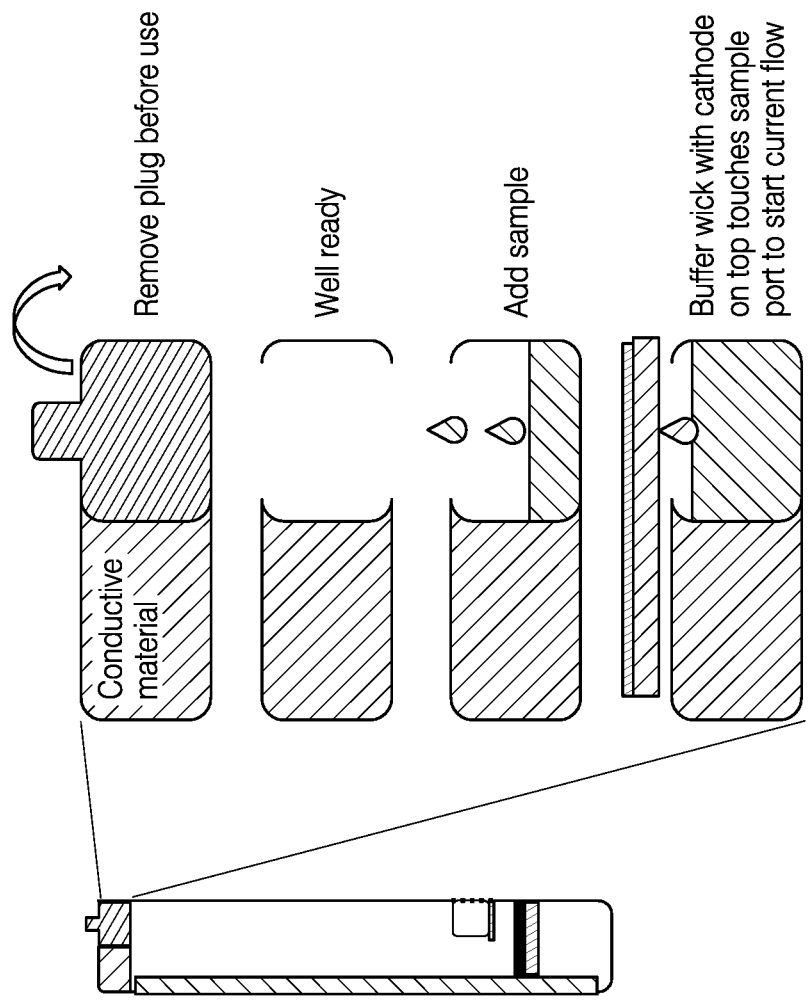
FIG. 11B is a side view of an exemplary device of the disclosure, showing an exemplary port operable to load a sample into the device, according to one embodiment.
Figure 11C:
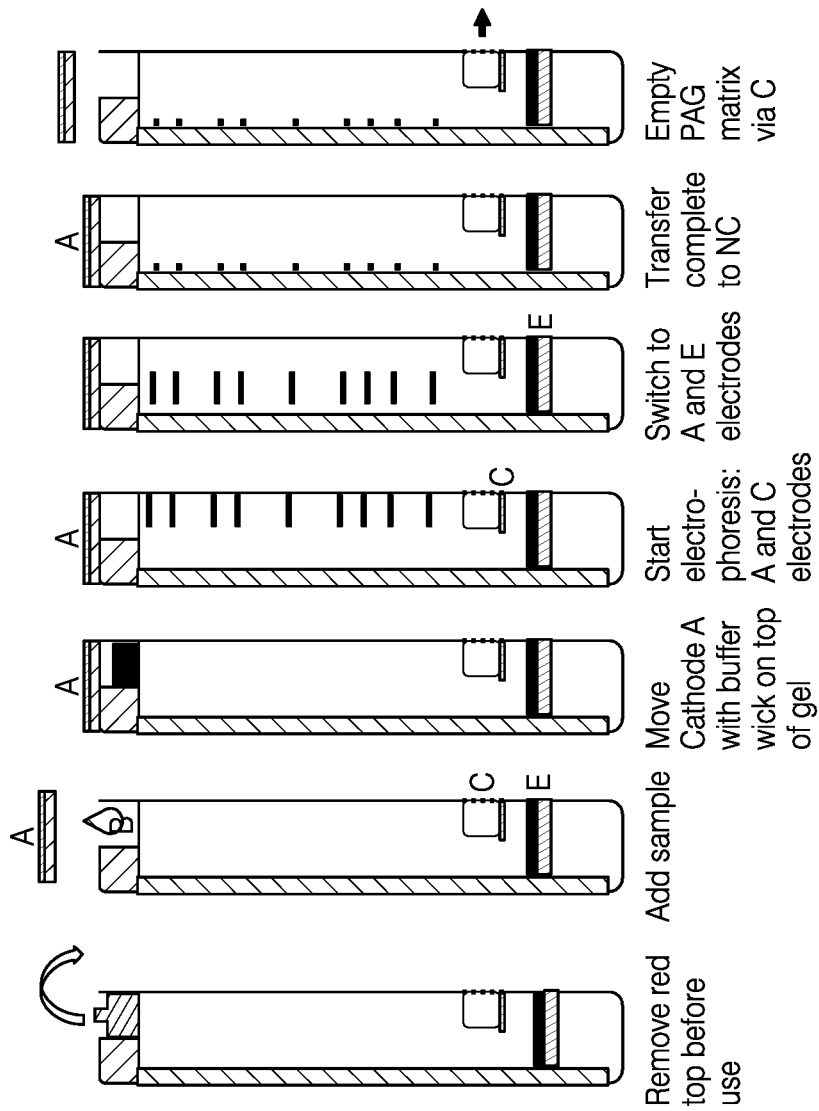
FIG. 11C is a side view of an exemplary system of the disclosure, showing electrophoresis and electrotransfer of biomolecules, according to one embodiment.
Figure 11D:
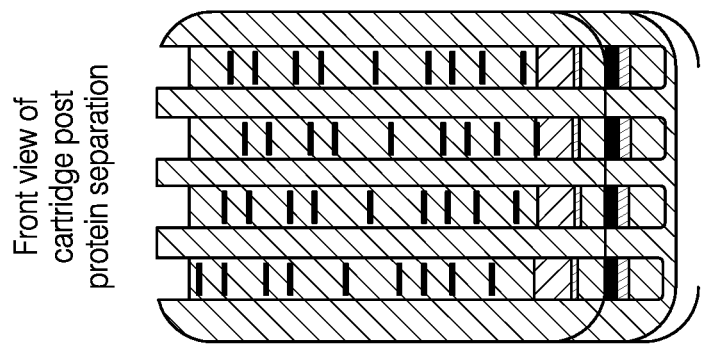
FIG. 11D is a top view of a device having a plurality of receptacles as shown in FIG. 11C, after electrophoresis and electrotransfer of biomolecules, according to one embodiment.
Figure 12A:
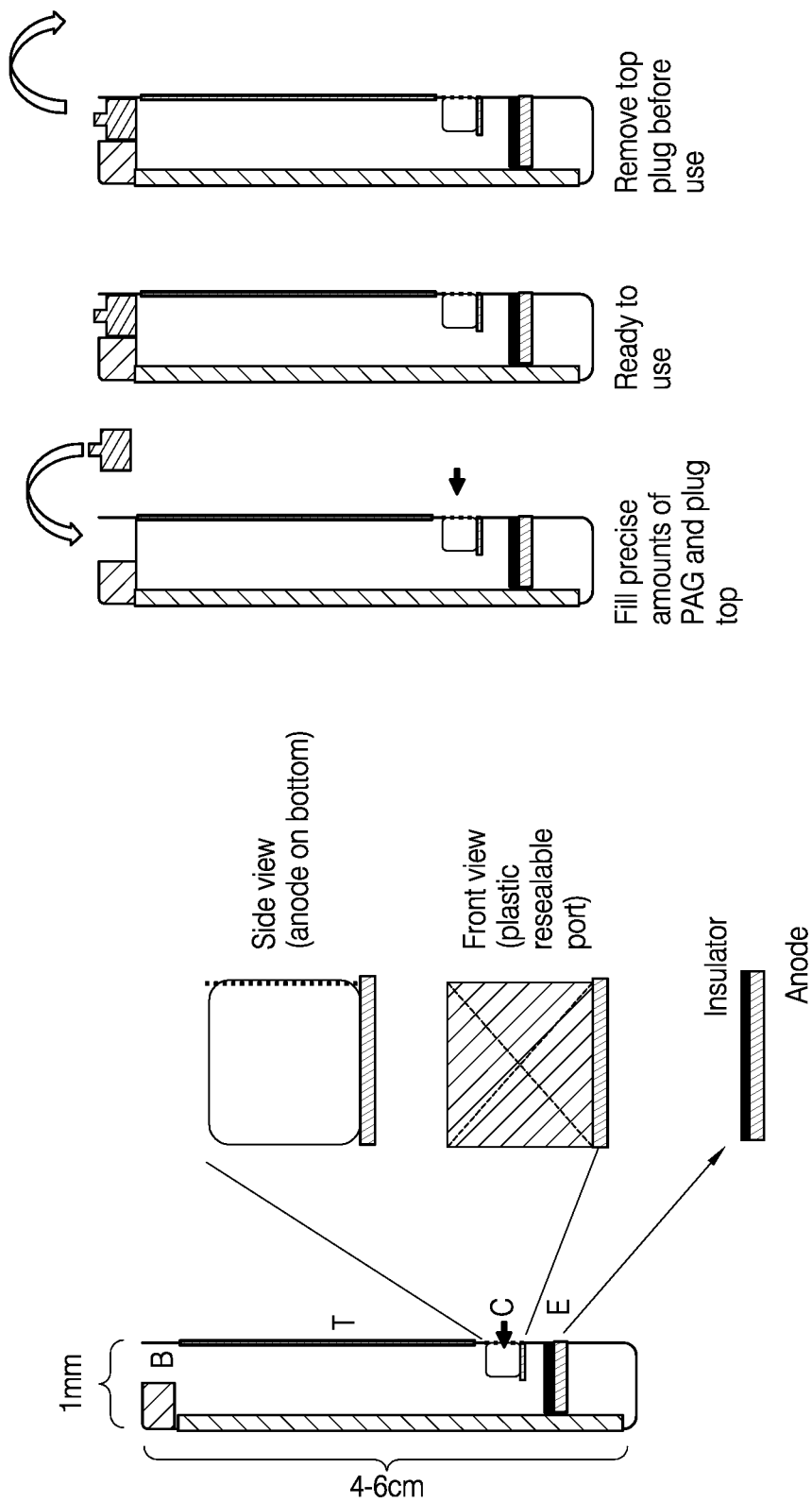
FIG. 12A is a side view of an exemplary device of the disclosure, showing an exemplary port operable to load a matrix into the device, according to one embodiment.
Figure 12B:
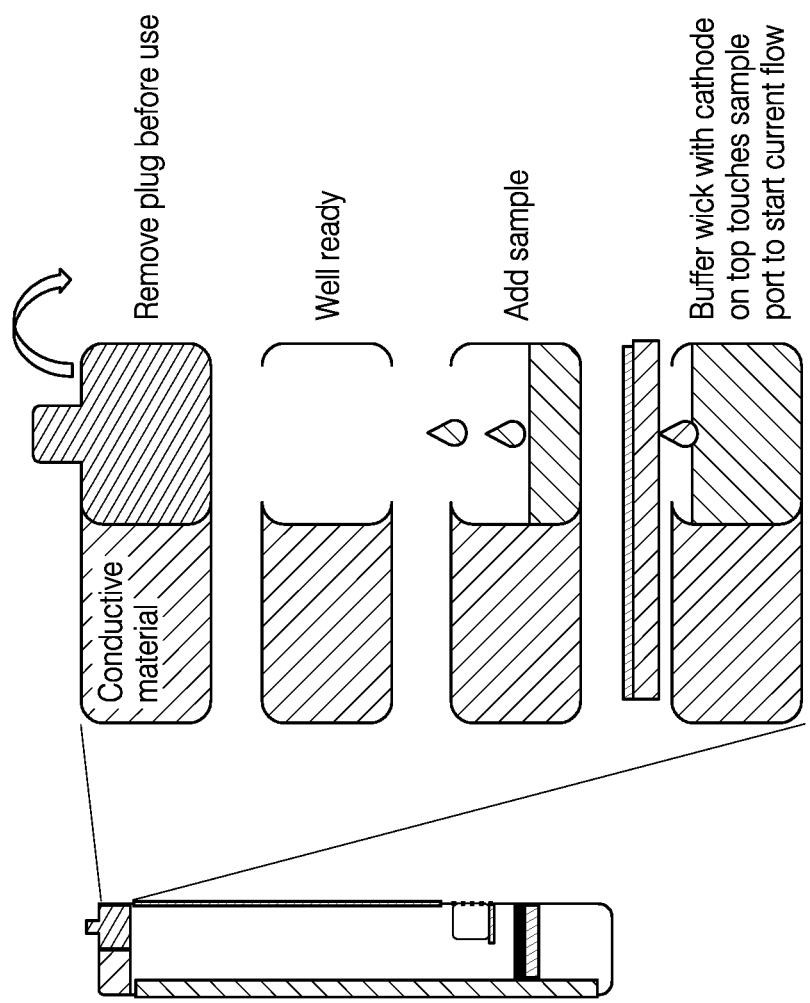
FIG. 12B is a side view of an exemplary device of the disclosure, showing an exemplary port operable to load a matrix into the device, according to one embodiment.
Figure 12C:
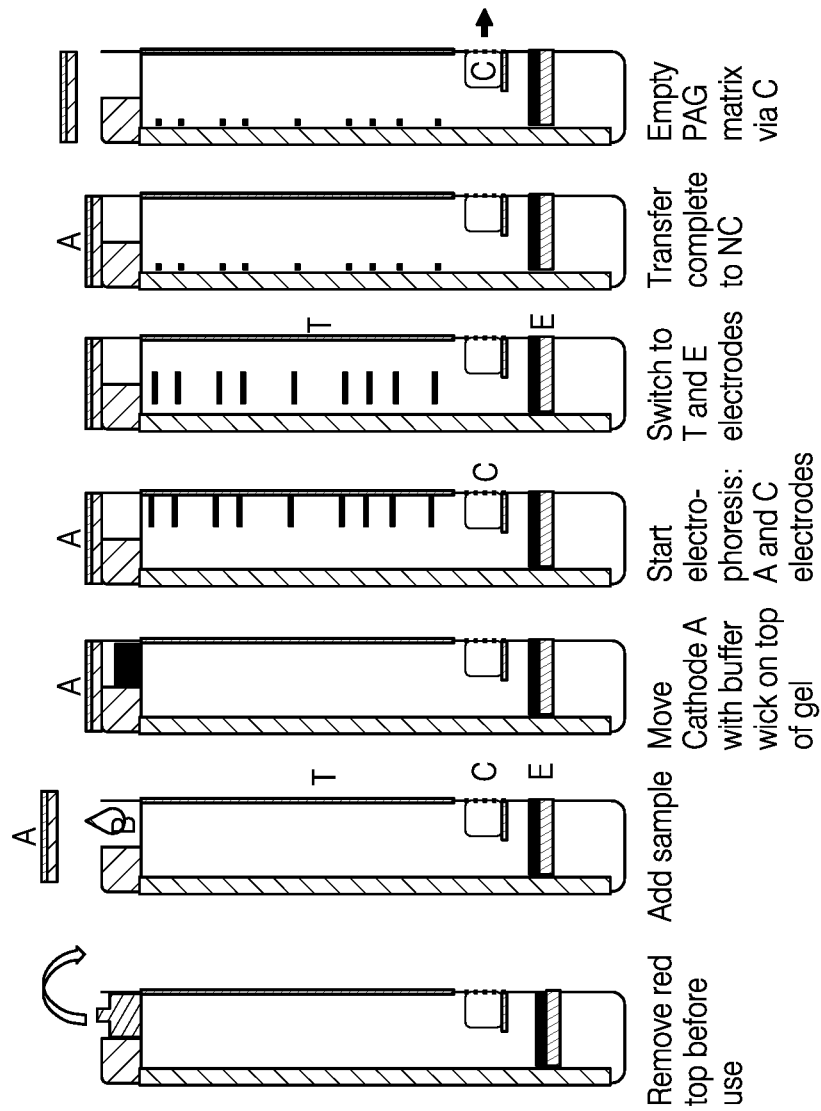
FIG. 12C is a side view of an exemplary system of the disclosure, showing electrophoresis and electrotransfer of biomolecules, according to one embodiment.

Prior to use, as shown in FIG. 11B the plug is removed and this area serves as a sample well. Sample is added into this sample well and a cover comprising another electrode (see yellow line in FIG. 11B) is used to cover the port B and well area of the receptacle. Electrophoresis and then electrotransfer is carried out as depicted in FIG. 11C. Top electrode, cathode A can be placed over a buffer wick (ion reservoir) and electrodes A and C are activated for electrophoresis. Electrode C is switched off and electrode A and E are activated to carry out electrotransfer. Once electrotransfer is completed and the biomolecules are transferred to the biomolecule receiving material on one side of the receptacle. As shown in the last panel of FIG. 11C, the liquid matrix can be drained out of the receptacle via port C and the device can now be used for detection by adding detecting reagents through port B. FIG. 11D shows a front view of the device after separation of the biomolecules and/or after detection. FIG. 12A depicts another embodiment of a vertical orientation of a device of the disclosure which has a receptacle enclosed on all sides having two ports, port B and port C, and a biomolecule receiving material (depicted in blue), placed on side of the receptacle. Port B is sealed with a removable plug (the seal forming one part of the enclosure of the receptacle), In this embodiment, as depicted in the right panel of FIG. 12A, port C is a pierceable and auto-sealable port that can be used to fill a liquid matrix into the receptacle. Once liquid matrix is filled up to the beginning of port B the plug (depicted in red) is used to seal port B located on the top. Receptacle of this device further comprises an electrode E (depicted in yellow) adjacent to an insulator (shown as a black line) and electrode C located in port C (depicted in yellow) and an electrode T located on or in the side wall of the receptacle on the side opposite to the biomolecule receiving material. Prior to use, as shown in FIG. 12B the plug is removed and this area serves as a sample well. Sample is added into this sample well and a cover comprising another electrode (see yellow line in FIG. 12B) is used to cover the port B and the sample well area of the receptacle. Electrophoresis and then electrotransfer is carried out as depicted in FIG. 12C. Top electrode, cathode A can be placed over a buffer wick (ion reservoir) and electrodes A and C are activated for electrophoresis. Electrode C is switched off and electrode A and E are activated to carry out electrotransfer. Once electrotransfer is completed and the biomolecules are transferred to the biomolecule receiving material on one side of the receptacle.

Figure 12D:
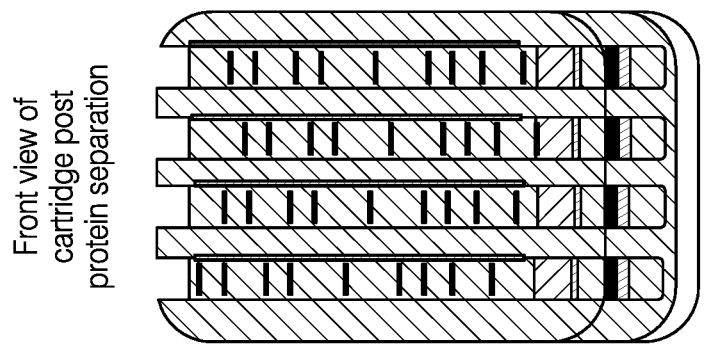
FIG. 12D is a top view of a device having a plurality of receptacles as shown FIG. 12C, after electrophoresis and electrotransfer of biomolecules, according to one embodiment.

As shown in the last panel of FIG. 12C, the liquid matrix can be drained out of the receptacle via port C and the device can now be used for detection by adding detecting reagents through port B. FIG. 12D shows a front view of the device after separation of the biomolecules and/or after detection. In some embodiment, a device comprises: at least one receptacle comprising: a matrix operable to separate the biomolecules along its length, the matrix having the sample loading area at its anterior end; a biomolecule receiving material, placed in a parallel plane below the matrix; at least a first electrode, a second electrode, a third electrode and a fourth electrode; the first electrode located above at least a portion of the matrix and positioned anterior to the sample loading area; the second electrode positioned toward the posterior end of the matrix; the third electrode in electrical contact with the biomolecule receiving material and positioned after the posterior end of the matrix; the fourth electrode located above the matrix; and at least one ion reservoir. In some embodiments, the first and the second and the third and the fourth electrode can be activated and inactivated.

Figure 13:
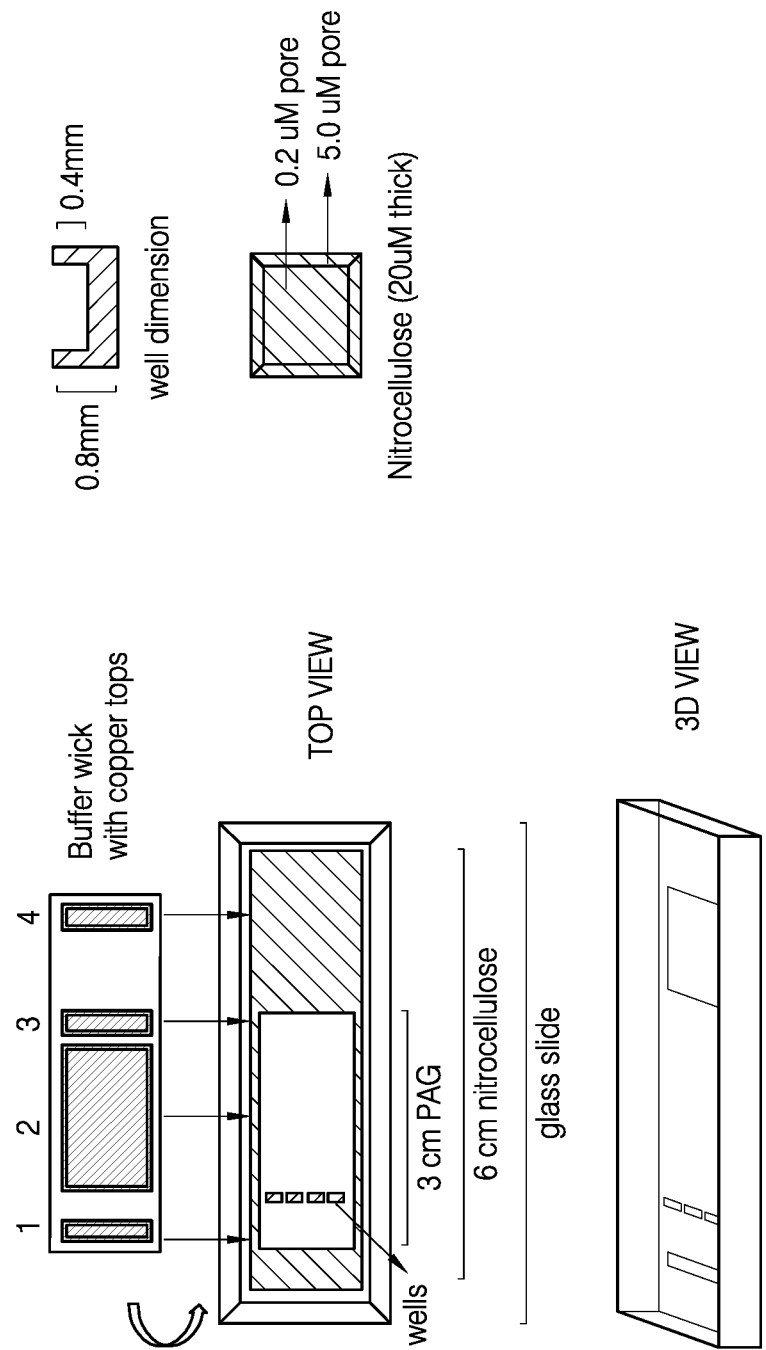
FIG. 13 depicts example components and example dimensions of some components of an exemplary electrophoresis and/or electrotransfer system of the disclosure, according to one embodiment.

FIG. 13 shows an example embodiment of components of a device of the disclosure, where the receptacle is a flat surface such as a glass slide or plastic slide. The receptacle of this device comprises two layers of a nitrocellulose coating as the biomolecule receiving region. Over this is a matrix (shown here as PAG) that has sample wells in the PAG (see white area in Top View and grey area in the 3-D View for matrix). A top view and a 3-D view show an example receptacle (shown as a glass slide here but could be a plastic slide as well) that is 8 cm long, 2.5 cm wide, 1 mm thick. The top panel numbered 1, 2 3 and 4 represents a plurality of electrodes (four electrodes shown in FIG. 13) arranged on top of an ion reservoir (shown as a buffer wick here). The legend below the Top View shows the various layers from top to bottom including a glass slide at the bottom, 6 cm of nitrocellulose (shown in blue color) and 3 cm of PAG. The electrodes with the buffer wick are placed on top of this device.

The side panel of FIG. 13 shown exemplary dimensions of a sample well in the PAG, having in this embodiment a 0.4 mm well depth to add samples while the total height of the PAG being 0.8 mm. Below this is shown an exemplary biomolecule receiving material shown here as nitrocellulose with a 20 µM thickness having two layers of different pore sized 0.2 µM and 5 µM pore sizes respectively. As noted in sections above the first layer is for binding of proteins and the second layer is to facilitate passage of electric current. The first layer can be about 10 µm thick with either a 0.2 µm or 0.45 µm pore size. The second layer is about 10 µm thick layer with 5 µm pore size located just below the first layer. A 3 cm long, 2 cm wide, 0.8 mm thick polyacrylamide gel (PAG) is casted on top of the nitrocellulose as shown in FIG. 13. Several sample wells that are about 0.25 mm deep can be formed in the PAG about 10 mm from one end for the purpose of sample addition. Well depths can be designed to have sufficient separation from the bottom of the PAG to allow migration of proteins for electrophoretic resolution in a straight path above the layer of the nitrocellulose. For example, wells that are too close to the bottom surface may cause the protein lanes to prematurely come in contact with the nitrocellulose resulting in a streaking effect on the latter. Electrodes 1, 3 and 4 shown in this example embodiment are 2 cm long×4 mm wide while electrode 2 has the same dimension as the PAG. Electrodes 1 and 3 are used for electrophoretic separation and electrodes 2 and 4 are used for diverting current flow from the PAG to the positive electrode via the nitrocellulose. All the wicks were pre-soaked with 2 ml of 1× electrophoresis buffer.

Figure 14A:
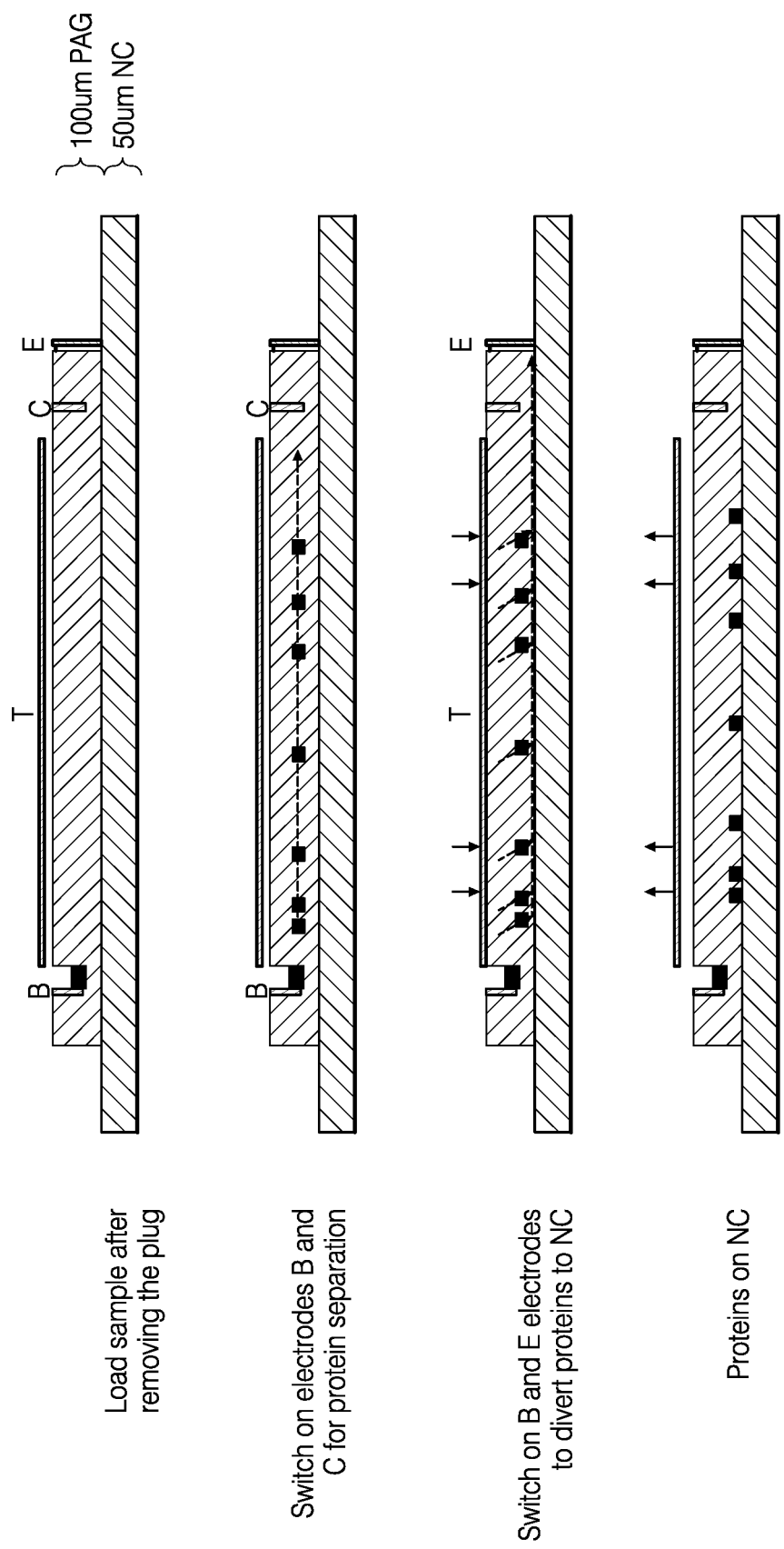
FIG. 14A is a side view of an exemplary system of the disclosure, showing electrophoresis and electrotransfer of biomolecules, according to one embodiment.
Figure 14B:
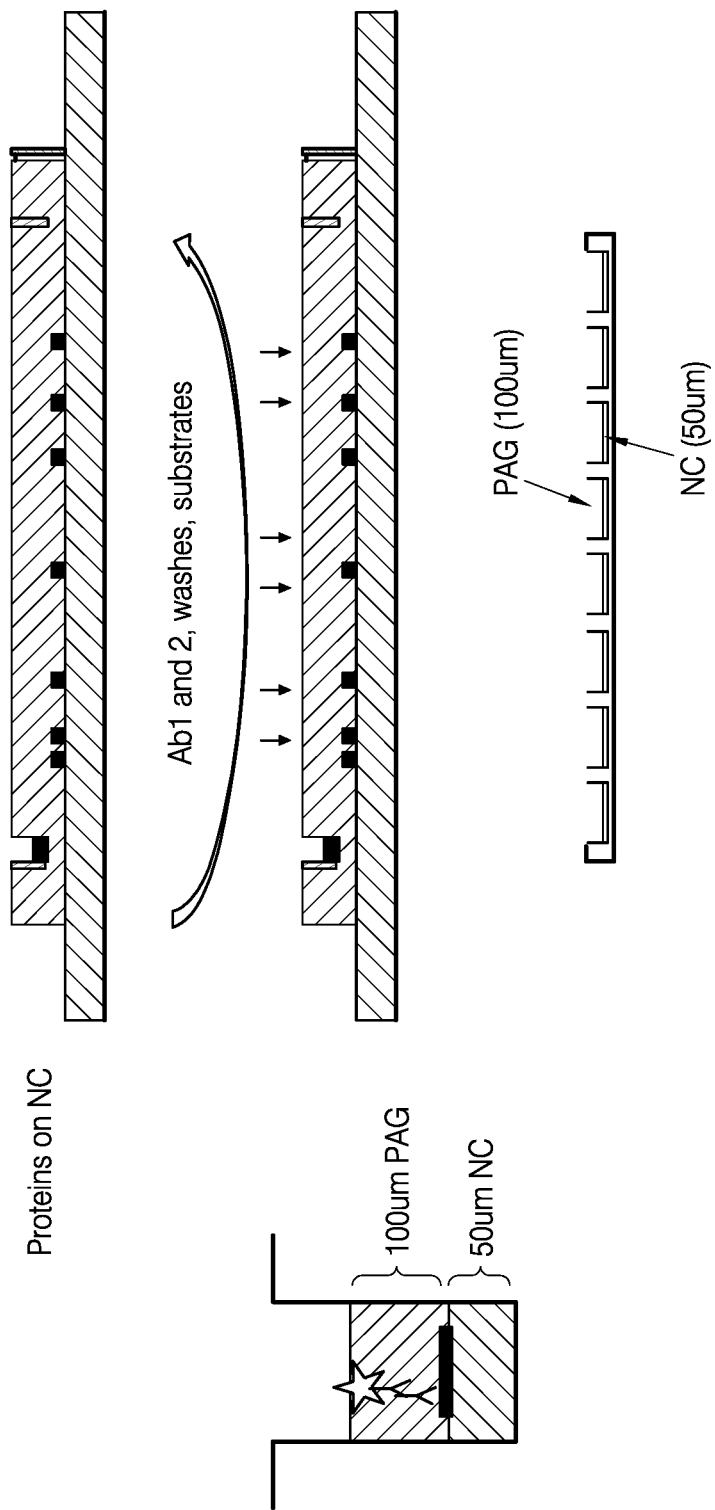
FIG. 14B is a side view of an exemplary system of the disclosure, showing electrophoresis and electrotransfer and immunodetection of biomolecules, according to one embodiment.
Figure 14C:
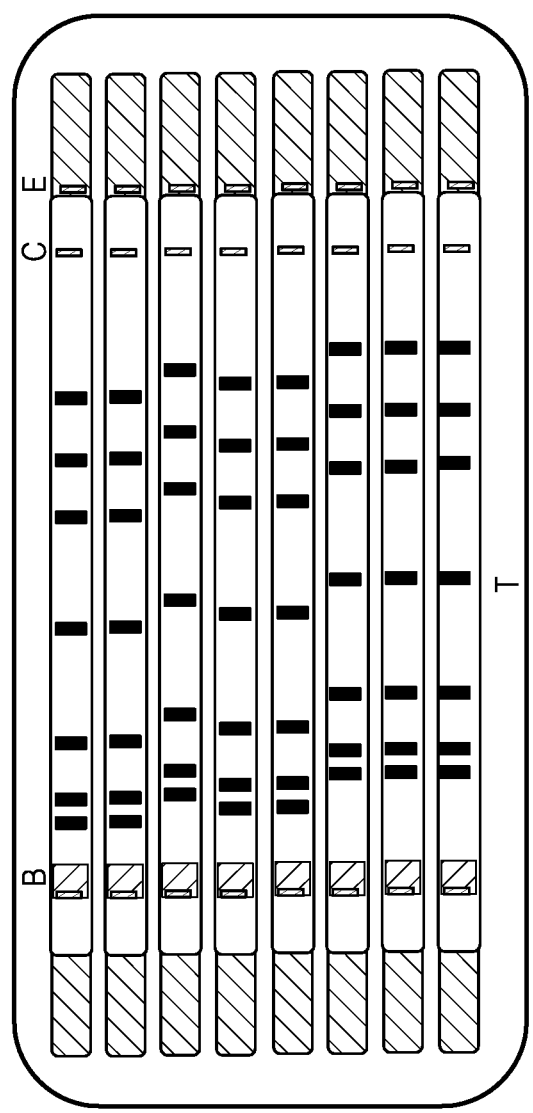
FIG. 14C is a top view a device having a plurality of receptacles as shown in FIG. 14A, after electrophoresis and electrotransfer of biomolecules, according to one embodiment.

FIGS. 14A 14B and 14C show one embodiment of a device of the disclosure comprising a thin layer of matrix (such as PAG) and a thin layer of a biomolecule receiving material (such as NC). In some embodiments, these devices enable a through gel detection which allows penetration of detection reagents and components (such as but not limited to antibodies, antigens and detectable labels and reagents), through the thin layer of the matrix to reach the biomolecules on the biomolecule receiving material that have been electrotransferred thereon. In some embodiments, a thin layer of matrix thin gels have a thickness of from about 20 µm to about 200 µm, including thicknesses in between such as 20 µm, 30 µm, 40 µm, 50 µm, 60 µm, 70 µm, 80 µm, 90 µm, 100 µm, 120 µm, 130 µm, 140 µm, 150 µm, 160 µm, 170 µm, 180 µm, 190 µm, and 200 µm, and in some embodiments about 100 µm. In some non-limiting embodiments, a thin layer of matrix can comprise an SDS-PAGE gel layer. In some embodiments, the thickness of a biomolecule receiving material in a device of the disclosure can be about half the thickness of the thin matrix layer.

As shown in FIG. 14B in a side view of a device, detection reagents can simply be layered on or washed over the device and detection of biomolecule can be achieved. As described in earlier embodiments, the devices depicted in FIGS. 14A-C are shown to have the one port and four electrode arrangement of electrodes B, C, E and T.

Accordingly, as depicted in FIGS. 14A-C, the present disclosure describes devices for electrophoresis, electrotransfer and detection of a biomolecule, wherein the device comprises: at least one receptacle comprising: a layer of matrix operable to separate the biomolecules along its length, the matrix having at least one port (such as port B in FIG. 14A); a biomolecule receiving material, placed below at least a portion of the matrix (in a parallel plane to the matrix if the matrix is of uniform thickness OR at an incline with the matrix when the matrix is of non-uniform thickness); a first electrode (such as electrode B in FIG. 14A) in electrical contact with the matrix and positioned anterior to the port or in the port; a second electrode (such as electrode E in FIG. 14A) positioned after the matrix, the second electrode in electrical contact with the biomolecule receiving material; a third electrode (such as electrode C in FIG. 14A) in electrical contact with the matrix and positioned after the biomolecule receiving area; a fourth electrode (such as electrode T in FIG. 14A) located above at least a portion of the matrix, wherein the port (port B) can receive a sample and can (later) receive one or more reagents for detection of the biomolecule.

2) Systems for Electrophoresis and/or Electrotransfer and/or Detection:

In some embodiments, the present disclosure provides a systems for performing gel electrophoresis, electrotransfer or detection, wherein one of the devices described in sections above can be placed into or on to an instrument that can provide a power-supply and/or means to activate and/or inactivate electrodes. In some embodiments, the present disclosure provides systems for performing gel electrophoresis, electrotransfer and/or detection, wherein one of the devices described in sections above can be connected to an electrical interface or power-supply interface to activate and/or inactivate electrodes. In some embodiments, the present disclosure provides a systems for performing gel electrophoresis, electrotransfer or detection, wherein one of the devices described in sections above can be either placed in an instrument or additionally have access to or functionality to access reagent sources that can carry out detection of biomolecules. Such functionality can among other non-limiting embodiments comprise capillaries, tubings, channels or microchannels pumps and valves for dispensing and/or regulating flow of reagents, timers and/or software component to regulate release/timed release of reagents and/or to regulate electrode activation/inactivation and/or to regulate electrode movement/repositioning during operation.

Some embodiments relate to systems comprising: any device of the disclosure as described herein further comprising one or more of the following: an instrument or a dock that can provide a power-supply; a means to activate and/or inactivate electrodes; capillaries; tubings; channel; microchannels; pumps; valves; robotic arms or motors; means to regulate electrode movement/repositioning; means for dispensing and/or regulating flow of reagents; software components to regulate release/timed release of reagents and/or to regulate electrode activation/inactivation and/or to regulate electrode movement/repositioning during operation.

II. Methods

Embodiments of the disclosure relate to methods of performing gel electrophoresis, and/or electrotransfer and/or detection of biomolecules contained in samples using the devices and systems described herein. Non limiting examples of biomolecules that can be electrophoresed or transferred or detected include, but are not limited to, nucleic acids, DNA, RNA, polypeptides and proteins.

In one embodiment, a method of performing electrotransfer of biomolecules comprises: 1) positioning a matrix comprising one or more biomolecules that have been separated based on their molecular weight or charge into or on top of a receptacle of a device, the device comprising: one or more of the receptacles, each receptacle comprising: a biomolecule receiving material; a first electrode; and a second electrode, wherein the second electrode is in electrical contact with the biomolecule receiving material and is located outside an area where biomolecules are received onto the biomolecule receiving material; 2) performing electrotransfer of the biomolecules from the matrix into the biomolecule receiving material comprising: (i) positioning the first electrode and a first ion reservoir above at least a portion of the matrix where the biomolecules are present; (ii) activating the first electrode and the second electrode thereby enabling transfer of the biomolecules onto the biomolecule receiving material. An example of such a method and results are depicted in FIGS. 4A and 4B (described above in additional detail).

In one embodiment, a method of performing electrotransfer of biomolecules comprises: 1) positioning a matrix comprising one or more biomolecules that have been separated based on their molecular weight or charge into or on top of a receptacle of a device, the device comprising: one or more of the receptacle, each receptacle comprising: a biomolecule receiving material; a first electrode; and a second electrode, wherein the electrodes are arranged to allow current flow in at least two directions, wherein the second direction of current flow is along the plane of the biomolecule receiving material; 2) performing electrotransfer of the biomolecules from the matrix into the biomolecule receiving material comprising: (i) positioning the first electrode and a first ion reservoir above at least a portion of the matrix where the biomolecules are present; (ii) activating the first electrode and the second electrode thereby enabling transfer of the biomolecules onto the biomolecule receiving material. An example of such a method and results are depicted in FIGS. 4A and 4B (described above in additional detail).

In one embodiment, a method of performing electrophoresis and electrotransfer of biomolecules comprises: 1) loading a sample comprising one or more biomolecules into a sample loading area of a device, the device comprising (i.e., for example a device having 2 electrodes with option to mechanically move the electrodes), at least one receptacle comprising: a matrix operable to separate the biomolecules along its length, the matrix having the sample loading area at least a first electrode and a second electrode; the first electrode located above at least a portion of the matrix and positioned anterior to the sample loading area; a second electrode, wherein the second electrode is in electrical contact with the biomolecule receiving material and is located outside an area where biomolecules are received onto the biomolecule receiving material; and at least one ion reservoir; 2) performing electrophoresis of the biomolecules in the matrix by activating both the electrodes; 3) inactivating the first and second electrodes to stop the electrophoresis; and 4) performing electrotransfer of the biomolecules from the matrix onto the biomolecule receiving material by: (i) moving/positioning the first electrode and a first ion reservoir onto at least a portion of the top of the matrix; (ii) moving/positioning the second electrode and a second ion reservoir past the distal end of the matrix such that the second electrode and the second ion reservoir are electrically connected to the biomolecule receiving material; (iii) activating the first electrode and the second electrode, enabling transfer of the biomolecule from the matrix into the biomolecule receiving material; and (iv) inactivating the first and second electrodes to stop the electrotransfer once complete. An example of such a method and results are depicted in FIGS. 5A and 5B (described above in additional detail).

In another embodiment, a method of performing electrophoresis and electrotransfer of biomolecules comprises: 1) loading a sample comprising one or more biomolecules into a sample loading area of a device, the device comprising (i.e., for example a device having 2 electrodes with option to mechanically move the electrodes), at least one receptacle comprising: a matrix operable to separate the biomolecules along its length, the matrix having the sample loading area at least a first electrode and a second electrode; the first electrode located above at least a portion of the matrix and positioned anterior to the sample loading area; a second electrode, wherein the second electrode in electrical contact with the biomolecule receiving material and positioned after the distal end of the matrix; and at least one ion reservoir; 2) performing electrophoresis of the biomolecules in the matrix by activating both the electrodes; 3) inactivating the first and second electrodes to stop the electrophoresis; and 4) performing electrotransfer of the biomolecules from the matrix onto the biomolecule receiving material by: (i) moving/positioning the first electrode and a first ion reservoir onto at least a portion of the top of the matrix; (ii) moving/positioning the second electrode and a second ion reservoir past the distal end of the matrix such that the second electrode and the second ion reservoir are electrically connected to the biomolecule receiving material; (iii) activating the first electrode and the second electrode, enabling transfer of the biomolecule from the matrix into the biomolecule receiving material; and (iv) inactivating the first and second electrodes to stop the electrotransfer once complete. An example of such a method and results are depicted in FIGS. 5A and 5B (described above in additional detail).

In another embodiment, a method of performing electrophoresis and electrotransfer of biomolecules comprises: 1) loading a sample having the biomolecule into a sample loading area in the matrix in a device of the disclosure (such as for example a device having 3 electrodes), the device comprising: at least one receptacle comprising: a matrix operable to separate the biomolecules along its length, the matrix having the sample loading area at its anterior end; a biomolecule receiving material, placed in a parallel plane below the matrix; at least a first electrode, a second electrode and a third electrode; the first electrode located above at least a portion of the matrix and positioned anterior to the sample loading area; the second electrode located above at least a portion of the matrix and positioned near the posterior end of the matrix; the third electrode in electrical contact with the biomolecule receiving material and positioned after the posterior end of a matrix that is insulated and separated from the third electrode; at least one ion reservoir adjacent to at least one of the electrodes; 2) performing electrophoresis of the sample in the matrix by activating the first and second electrodes; 3) inactivating the first and second electrodes to stop electrophoresis after the biomolecules are resolved; 4) performing electrotransfer of the biomolecule from the matrix onto the biomolecule receiving material by reactivating the first electrode and activating the third electrode wherein the third electrode is in electrical contact with the biomolecule receiving material; and 5) inactivating the first and third electrodes to stop the electrotransfer once complete.

FIG. 7A depicts a side view of an exemplary system having four ports and three electrodes and shows method steps for electrophoresis and electrotransfer of biomolecules and FIG. 7B depicts a top view of the same system after electrophoresis and electrotransfer of biomolecules is completed. FIG. 8A depicts a side view of an exemplary system having three ports and three electrodes and shows method steps for electrophoresis and electrotransfer of biomolecules and FIG. 8B depicts a top view of the same system after electrophoresis and electrotransfer of biomolecules is completed.

In another embodiment, a method of performing electrophoresis and electrotransfer of biomolecules comprises: 1) loading a sample or a plurality of samples having the biomolecule into a sample loading port of a device comprising (such as a device with 4 electrodes): at least one receptacle comprising: a matrix operable to separate the biomolecules along its length, the matrix having the sample loading area at its anterior end; a biomolecule receiving material, placed in a parallel plane below the matrix; at least a first electrode, a second electrode, a third electrode and a fourth electrode; the first electrode located above at least a portion of the matrix and positioned anterior to the sample loading area; the second electrode positioned toward the posterior end of the matrix; the third electrode in electrical contact with the biomolecule receiving material and positioned after the posterior end of a matrix that is insulated and separated from the third electrode; the fourth electrode located above the matrix; the fourth electrode located above the matrix and separated from latter by a transparent material with higher resistance compared to electrode material; and at least one ion reservoir; 2) performing electrophoresis of the samples in the matrix by activating the first electrode and the second electrode; 3) inactivating the first and second electrodes to stop the electrophoresis when complete; 4) performing electrotransfer of the biomolecule from the matrix into the biomolecule receiving material by: (i) activating the third electrode and the fourth electrode; and 5) inactivating the third and fourth electrodes when the electro transfer is completed. In non-limiting examples, a material separating the matrix and the fourth electrode can comprise agarose or another gel or an agarose-like material is from about 0.1 mm-5 mm thick. In some embodiments of a method as described here, one of the electrodes (such as T) is located along the edge of a receptacle such that it does not obstruct the view of the biomolecule receiving material from either side of the device.

FIG. 9A depicts a side view of an exemplary system having four ports and three electrodes and shows method steps for electrophoresis and electrotransfer of biomolecules. FIG. 9B depicts a top view of the same system after electrophoresis and electrotransfer of biomolecules is completed. Electrodes T, as depicted here, is located along the edge of a receptacle (of a channel in a receptacle—see FIG. 9B) such that it does not obstruct the view of the biomolecule receiving material when viewed from the top to monitor progress of the electrophoresis and/or electrotransfer and/or immunodetection.

FIG. 10A depicts a side view of an exemplary system having three ports and three electrodes and shows method steps for electrophoresis and electrotransfer of biomolecules. FIG. 10B depicts a top view of the same system after electrophoresis and electrotransfer of biomolecules is completed. Electrodes T, as depicted here, is located along the edge of a receptacle (of a channel/conduit/capillary/path in a receptacle or a plurality of channels in receptacles see FIG. 10B) such that it does not obstruct the view of the biomolecule receiving material when viewed from the top to monitor progress of the electrophoresis and/or electrotransfer and/or immunodetection.

FIG. 11A depicts one embodiment of a vertical orientation of a device of the disclosure which has a receptacle enclosed on all sides having two ports, port B and port C, and a biomolecule receiving material (depicted in blue), placed on side of the receptacle. Port B is sealed with a removable plug (the seal forming one part of the enclosure of the receptacle), In this embodiment, as depicted in the right panel of FIG. 11A, port C is a pierceable and auto-sealable port that can be used to fill a liquid matrix into the receptacle. Once liquid matrix is filled up to the beginning of port B the plug (depicted in red) is used to seal port B located on the top. Receptacle of this device further comprises an electrode E (depicted in yellow) adjacent to an insulator (shown as a black line) and electrode C located in port C (depicted in yellow).

In use, as shown in FIG. 11B, the plug is removed and this area serves as a sample well. Sample is added into this sample well and a cover comprising another electrode (see yellow line in FIG. 11B) is used to cover the port B and well area of the receptacle. Electrophoresis and then electrotransfer is carried out as depicted in FIG. 11C. Top electrode, cathode A can be placed over a buffer wick (ion reservoir) and electrodes A and C are activated for electrophoresis. Electrode C is switched off and electrode A and E are activated to carry out electrotransfer. Once electrotransfer is completed and the biomolecules are transferred to the biomolecule receiving material on one side of the receptacle. As shown in the last panel of FIG. 11C, the liquid matrix can be drained out of the receptacle via port C and the device can now be used for detection by adding detecting reagents through port B. FIG. 11D shows a front view of the device after separation of the biomolecules and/or after detection.

FIG. 12A depicts another embodiment of a vertical orientation of a device of the disclosure which has a receptacle enclosed on all sides having two ports, port B and port C, and a biomolecule receiving material (depicted in blue), placed on side of the receptacle. Port B is sealed with a removable plug (the seal forming one part of the enclosure of the receptacle), In this embodiment, as depicted in the right panel of FIG. 12A, port C is a pierceable and auto-sealable port that can be used to fill a liquid matrix into the receptacle. Once liquid matrix is filled up to the beginning of port B the plug (depicted in red) is used to seal port B located on the top. Receptacle of this device further comprises an electrode E (depicted in yellow) adjacent to an insulator (shown as a black line) and electrode C located in port C (depicted in yellow) and an electrode T located on or in the side wall of the receptacle on the side opposite to the biomolecule receiving material.

Prior to use, as shown in FIG. 12B the plug is removed and this area serves as a sample well. Sample is added into this sample well and a cover comprising another electrode (see yellow line in FIG. 12B) is used to cover the port B and the sample well area of the receptacle. Electrophoresis and then electrotransfer is carried out as depicted in FIG. 12C. Top electrode, cathode A can be placed over a buffer wick (ion reservoir) and electrodes A and C are activated for electrophoresis. Electrode C is switched off and electrode A and E are activated to carry out electrotransfer. Once electrotransfer is completed and the biomolecules are transferred to the biomolecule receiving material on one side of the receptacle. As shown in the last panel of FIG. 12C, the liquid matrix can be drained out of the receptacle via port C and the device can now be used for detection by adding detecting reagents through port B. FIG. 12D shows a front view of the device after separation of the biomolecules and/or after detection.

FIGS. 14A-C, the present disclosure describe devices for electrophoresis, electrotransfer and detection of a biomolecule, wherein the device comprises: at least one receptacle comprising: a layer of matrix operable to separate the biomolecules along its length, the matrix having at least one port (such as port B in FIG. 14A); a biomolecule receiving material, placed in a parallel plane below the matrix; a first electrode (such as electrode B in FIG. 14A) in electrical contact with the matrix and positioned anterior to the port or in the port; a second electrode (such as electrode E in FIG. 14A) positioned after the matrix, the second electrode in electrical contact with the biomolecule receiving material; a third electrode (such as electrode C in FIG. 14A) in electrical contact with the matrix and positioned after the biomolecule receiving area; a fourth electrode (such as electrode T in FIG. 14A) located above at least a portion of the matrix, wherein the port (port B) can receive a sample and can (later) receive one or more reagents for detection of the biomolecule. In some embodiments, the layer of matrix is a thin layer.

As depicted in FIGS. 14A-C, the present disclosure describes methods for electrophoresis, electrotransfer and detection of a biomolecule comprising: 1) loading a sample or a plurality of samples having the biomolecule into a port of a device comprising: wherein the device comprises: at least one receptacle comprising: a layer of matrix operable to separate the biomolecules along its length, the matrix having at least one port (such as port B in FIG. 14A); a biomolecule receiving material, placed in a parallel plane below the matrix; a first electrode (such as electrode B in FIG. 14A) in electrical contact with the matrix and positioned anterior to the port or in the port; a second electrode (such as electrode E in FIG. 14A) positioned after the matrix, the second electrode in electrical contact with the biomolecule receiving material; a third electrode (such as electrode C in FIG. 14A) in electrical contact with the matrix and positioned after the biomolecule receiving area; a fourth electrode (such as electrode T in FIG. 14A) located above at least a portion of the matrix, wherein the port (port B) can receive a sample and can (later) receive one or more reagents for detection of the biomolecule 2) performing electrophoresis of the samples in the thin matrix by activating the first electrode (electrode B) and the third electrode (electrode C); 3) inactivating the first and the third electrodes to stop the electrophoresis when complete; 4) performing electrotransfer of the biomolecule from the thin matrix into the biomolecule receiving material by activating the second electrode (electrode E) and the fourth electrode (electrode T); 5) inactivating the second and fourth electrodes when the electro transfer is completed; and 6) adding one or a plurality of detection reagents into the single port (port B) OR adding one or a plurality of detection reagents over the matrix layer and allowing the detection reagents to pass through the matrix into the biomolecule receiving material to contact the biomolecules and detect the biomolecules. In some embodiments, the layer of matrix is a thin layer of matrix that has a thickness of from about 20 μm to about 200 μm, including thicknesses in between such as 20 μm, 30 μm, 40 μm, 50 μm, 60 μm, 70 μm, 80 μm, 90 μm, 100 μm, 120 μm, 130 μm, 140 μm, 150 μm, 160 μm, 170 μm, 180 μm, 190 μm, and 200 μm. In some embodiments the thin layer has a thickness of about 100 μm. In some non-limiting embodiments, a thin layer of matrix can comprise an SDS-PAGE gel layer. In some embodiments, the thickness of a biomolecule receiving material in a device of the disclosure can be about half the thickness of the thin matrix layer.

In some embodiments, one or more of the ports, or one or more pair combinations of any of the ports such as for example ports A-C, A-D, B-C or B-D can be used to facilitate addition and removal of buffers, antibody solutions and detection reagents such as chemiluminescent reagents. In some embodiments, ports can be used for various aspects if automating western blotting by enabling detection assays (such as an immunoassay) by evacuating a liquid matrix from a receptacle (such as a channel) after electrotransfer and flowing in a detection reagent into the same receptacle/channel that now comprise the biomolecule receiving material that has biomolecules electrotransferred into it.

In some embodiments of the methods of the disclosure, variously set forth in sections above, a device used comprises a plurality of receptacles and a plurality of samples are loaded one into the sample loading area of each receptacle. In some embodiments, the biomolecules to be electrophoresed and/or to be electrotransferred, are stained prior to being loaded. the biomolecules are pre-stained.

In some embodiments of the methods of the disclosure, variously set forth in sections above, biomolecules can be visualized while being electrophoresed and electrotransferred. In some embodiments, methods of the disclosure can comprise visualizing the biomolecules during or at the end of the electrophoresis steps and or the electro transfer steps by viewing the device from the top. In some embodiments, methods of the disclosure can further comprise imaging the biomolecules during or at the end of the electrophoresis steps and or the electro transfer step.

Systems, devices, cassettes and methods of the disclosure, advantageously result in one or more of the foregoing including: one device/system for electrophoresis and electrotransfer, ability to conduct high throughput electrophoresis and/or electrotransfer of biomolecules at the same time, reduced number of devices or components, reduced cost, reduced accessories, reduced footprint of equipment needed, reduced space for storage of systems and devices, no buffer spillage, leakage, reduced amount of gels, biomolecule receiving materials, samples, buffers and other components used, and reduced liquid hazardous waste as compared to existing systems and devices for electrophoresis or electrotransfer.

All publications, patents, and patent applications mentioned in this specification are herein incorporated by reference to the same extent as if each individual publication, patent, or patent application was specifically and individually indicated to be incorporated by reference.

While embodiments of the present disclosure have been shown and described herein, it will be obvious to those skilled in the art that such embodiments are provided by way of example only. Numerous variations, changes, and substitutions will now occur to those skilled in the art without departing from the disclosure. It should be understood that various alternatives to the embodiments of the disclosure described herein may be employed in practicing the disclosure. It is intended that the following claims define the scope of the disclosure and that methods and structures within the scope of these claims and their equivalents be covered thereby.

What is claimed is:

1. A device for electrotransfer of biomolecules comprising:
    at least one receptacle comprising:
        a biomolecule receiving material;
        a first electrode; and
        a second electrode, wherein the second electrode is in electrical contact with the biomolecule receiving material, and is located distal to and/or posterior to an area where biomolecules are received
        wherein the biomolecule receiving material is placed on the receptacle.

2. The device of claim 1, wherein the biomolecule receiving material is located in a plane and wherein the second electrode is located above the biomolecule receiving material or wherein the second electrode is located along the same plane as the biomolecule receiving material or wherein the second electrode is located below the biomolecule receiving material.

3. The device of claim 1,
    wherein the first and second electrodes are arranged to allow current flow in at least two directions, wherein a first direction of current flow is transverse to a plane of the biomolecule receiving material or wherein a first direction of current flow is diagonal to a plane of the biomolecule receiving material or wherein a first direction of current flow is perpendicular to a plane of the biomolecule receiving material, and,
    wherein a second direction of current flow is along a plane of the biomolecule receiving material.

4. The device of claim 1, wherein the receptacle is a channel, a microfluidic channel, a surface, a glass slide, a plastic slide, a vessel, a container, or a chamber.

5. The device of claim 1, comprising a plurality of receptacles.

6. The device of claim 1, wherein the receptacle is made of a transparent material.

7. The device of claim 1, wherein the device is a microfluidic device.

8. The device of claim 1, wherein the biomolecule receiving material comprises a membrane, nitrocellulose, PVDF, cellulose acetate, anodic aluminum oxide, or one or more conductive materials embedded in any of the foregoing.

9. The device of claim 8, wherein the conductive materials embedded in the biomolecule receiving material comprise tantalum, copper, indium, or tin oxide.

10. The device of claim 1, wherein the biomolecule receiving material comprises one or more ions.

11. The device of claim 1, wherein the biomolecule receiving material has a pore size of from about 0.2 µM-10 µM.

12. The device of claim 1, wherein the biomolecule receiving material has a pore size that is different in different areas in the same layer of the biomolecule receiving material.

13. The device of claim 1, wherein the biomolecule receiving material has one or more layers.

14. The device of claim 13, wherein each layer of the biomolecule receiving material has a different pore size.

15. The device of claim 1, wherein the first electrode is positioned above at least a portion of the biomolecule receiving material.

16. The device of claim 15, wherein the first electrode is further positioned before an area where biomolecules are received onto the biomolecule receiving material.

17. A device of claim 1, further comprised in a system, comprising one or more of the following:
    an instrument or a dock that can provide a power-supply; a means to activate and/or inactivate electrodes; capillaries; tubings; channel; microchannels; pumps; valves; robotic arms or motors; means to regulate electrode movement/repositioning; means for dispensing and/regulating flow of reagents; software components to regulate release/timed release of reagents and/or to regulate electrode activation/inactivation and/or to regulate electrode movement/repositioning during operation.

18. A method of electrophoresis and electrotransfer of biomolecules comprising:
    1) Loading a sample comprising one or more biomolecules into a sample loading area of a device, the device comprising:
        at least one receptacle comprising:

a matrix operable to separate the biomolecules along its length, the matrix having the sample loading area at its anterior end;
a biomolecule receiving material, placed below the matrix;
at least a first electrode and a second electrode;
the first electrode located above at least a portion of the matrix and positioned anterior to the sample loading area;
the second electrode in electrical contact with the biomolecule receiving material and located outside an area where biomolecules are received onto the biomolecule receiving material; and
at least one ion reservoir;
2) Performing electrophoresis of the biomolecules in the matrix by activating both the electrodes;
3) inactivating the first and second electrodes to stop the electrophoresis; and
4) performing electrotransfer of the biomolecules from the matrix onto the biomolecule receiving material by:
  (i) moving/positioning the first electrode and a first ion reservoir onto at least a portion of the top of the matrix;
  (ii) moving/positioning the second electrode and a second ion reservoir past the distal end of the matrix such that the second electrode and the second ion reservoir are electrically connected to the biomolecule receiving material;
  (iii) activating the first electrode and the second electrode, enabling transfer of the biomolecule from the matrix into the biomolecule receiving material; and
  (iv) inactivating the first and second electrodes to stop the electrotransfer once complete.

19. A device for electrotransfer of biomolecules comprising:
at least one receptacle comprising:
  a biomolecule receiving material;
  a first electrode; and
  a second electrode, wherein the second electrode is in electrical contact with the biomolecule receiving material, and is located distal to and/or posterior to an area where biomolecules are received, wherein the biomolecule receiving material has a pore size that is different in different areas in the same layer of the biomolecule receiving material.

20. The device of claim 19, wherein the biomolecule receiving material is located in a plane and wherein the second electrode is located above the biomolecule receiving material or wherein the second electrode is located along the same plane as the biomolecule receiving material or wherein the second electrode is located below the biomolecule receiving material.

21. The device of claim 19, wherein the electrodes are arranged to allow current flow in at least two directions, wherein a first direction of current flow is transverse to a plane of the biomolecule receiving material or wherein a first direction of current flow is diagonal to a plane of the biomolecule receiving material or wherein a first direction of current flow is perpendicular to a plane of the biomolecule receiving material, and, wherein a second direction of current flow is along a plane of the biomolecule receiving material.

22. The device of claim 19, wherein the receptacle is a channel, a microfluidic channel, a surface, a glass slide, a plastic slide, a vessel, a container, or a chamber.

23. The device of claim 19, comprising a plurality of receptacles.

24. The device of claim 19, wherein the receptacle is made of a transparent material.

25. The device of claim 19, wherein the device is a microfluidic device.

26. The device of claim 19, wherein the biomolecule receiving material is placed on the receptacle.

27. The device of claim 19, wherein the biomolecule receiving material comprises a membrane, nitrocellulose, PVDF, cellulose acetate, anodic aluminum oxide, or one or more conductive materials embedded in any of the foregoing.

28. The device of claim 27, wherein the conductive materials embedded in the biomolecule receiving material comprise tantalum, copper, indium, or tin oxide.

29. The device of claim 19, wherein the biomolecule receiving material comprises one or more ions.

30. The device of claim 19, wherein the biomolecule receiving material has a pore size of from about 0.2 µM-10 µM.

31. The device of claim 19, wherein the biomolecule receiving material has one or more layers.

32. The device of claim 31, wherein each layer of the biomolecule receiving material has a different pore size.

33. The device of claim 19, wherein the first electrode is positioned above at least a portion of the biomolecule receiving material.

34. The device of claim 33, wherein the first electrode is further positioned before an area where biomolecules are received onto the biomolecule receiving material.

35. A device of claim 19, further comprised in a system, comprising one or more of the following:
an instrument or a dock that can provide a power-supply; a means to activate and/or inactivate electrodes; capillaries; tubings; channel; microchannels; pumps; valves; robotic arms or motors; means to regulate electrode movement/repositioning; means for dispensing and/or regulating flow of reagents; software components to regulate release/timed release of reagents and/or to regulate electrode activation/inactivation and/or to regulate electrode movement/repositioning during operation.

* * * * *